United States Patent [19]

Terada et al.

[11] Patent Number: 4,550,345
[45] Date of Patent: Oct. 29, 1985

[54] MAGNETIC VIDEO PILOT SIGNAL RECORDING/REPRODUCING SYSTEM

[75] Inventors: Toshimichi Terada, Chigasaki; Tomomitsu Kuroyanagi, Katsuta; Noboru Kozima, Yokohama; Akira Shibata, Katsuta, all of Japan

[73] Assignee: Hitachi, Ltd., Tokyo, Japan

[21] Appl. No.: 447,797

[22] Filed: Dec. 8, 1982

[30] Foreign Application Priority Data

| Dec. 9, 1981 | [JP] | Japan | 56-196775 |
| Dec. 9, 1981 | [JP] | Japan | 56-196777 |
| Jan. 11, 1982 | [JP] | Japan | 57-1828 |
| Jan. 11, 1982 | [JP] | Japan | 57-1830 |
| Jan. 11, 1982 | [JP] | Japan | 57-1835 |
| Jan. 11, 1982 | [JP] | Japan | 57-1838 |

[51] Int. Cl.$^4$ .......................................... H04N 5/92
[52] U.S. Cl. ................................ 358/323; 360/27; 360/73
[58] Field of Search ............... 360/73, 9.1, 10.1, 10.3, 360/27, 33.1, 70, 77; 358/310, 321, 323; 369/47, 48, 50

[56] References Cited

U.S. PATENT DOCUMENTS

| 3,809,804 | 5/1974 | Okuno | 360/27 |
| 4,131,912 | 12/1978 | Hirai | 360/10.3 |
| 4,249,220 | 2/1981 | Yasutake | 360/73 |

Primary Examiner—Alan Faber
Attorney, Agent, or Firm—Antonelli, Terry & Wands

[57] ABSTRACT

In a video tape recorder of the rotary two-head helically scanning type, a magnetic recording/reproducing system provided with a mode judging device in which a video signal is recorded onto a recording track in a multiplex manner together with a pilot signal for use in judgement of the recording time mode and when the record is reproduced the pilot signal is detected to thereby judge the recording time mode.

11 Claims, 58 Drawing Figures

FIRST RECORDING
TIME MODE
(SP-MODE)

SECOND RECORDING
TIME MODE
(LP-MODE)

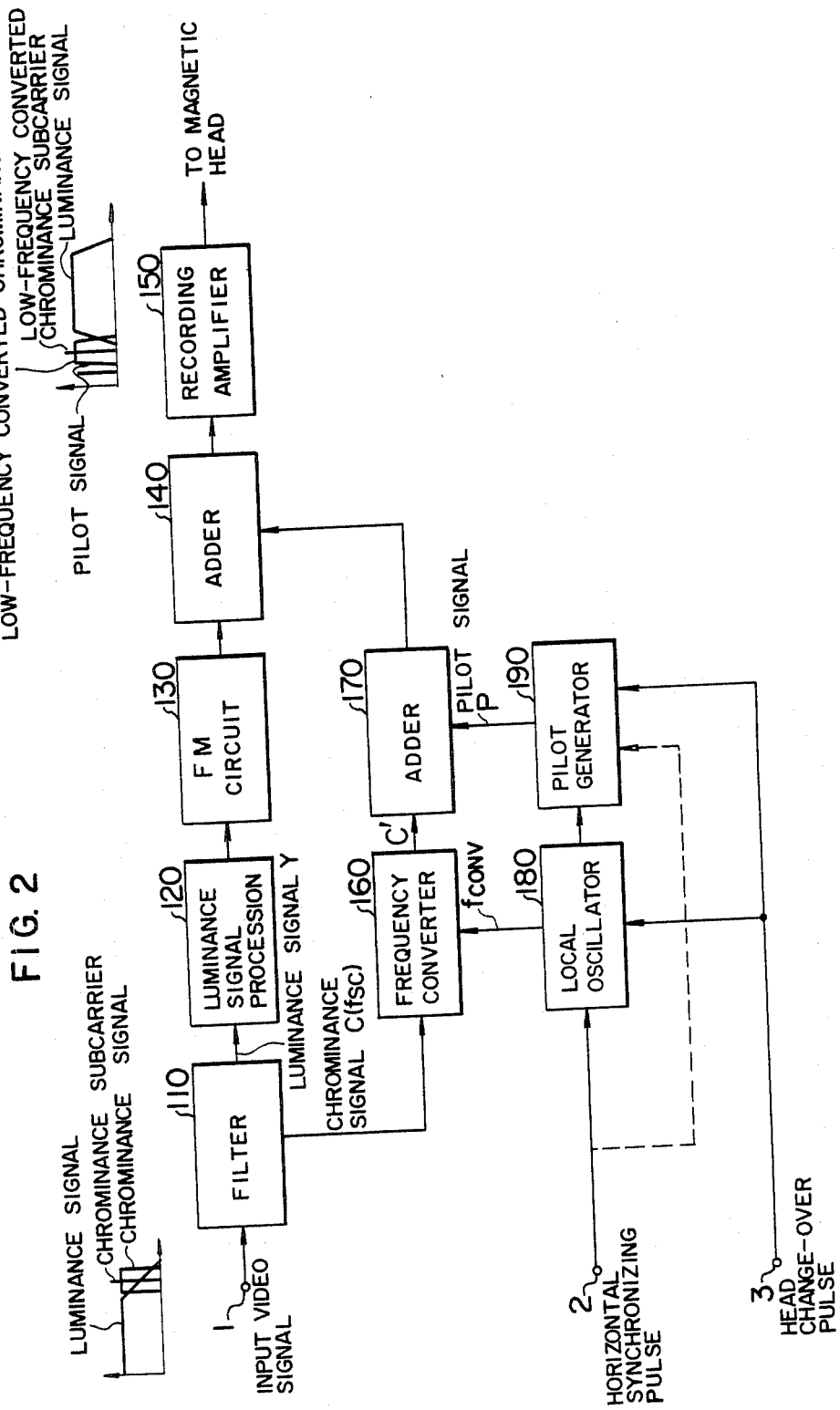

FIG. 4
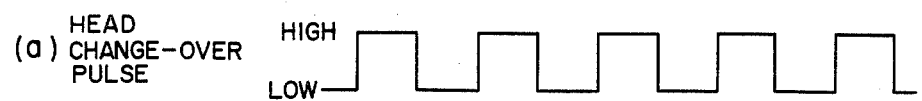
(a) HEAD CHANGE-OVER PULSE
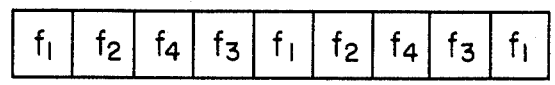
(b) OUTPUT OF FREQ. SELECTOR 950 (SP-MODE)
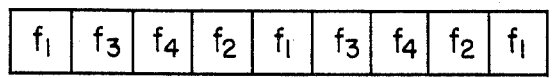
(c) OUTPUT OF FREQ. SELECTOR 950 (LP-MODE)
FIG. 6
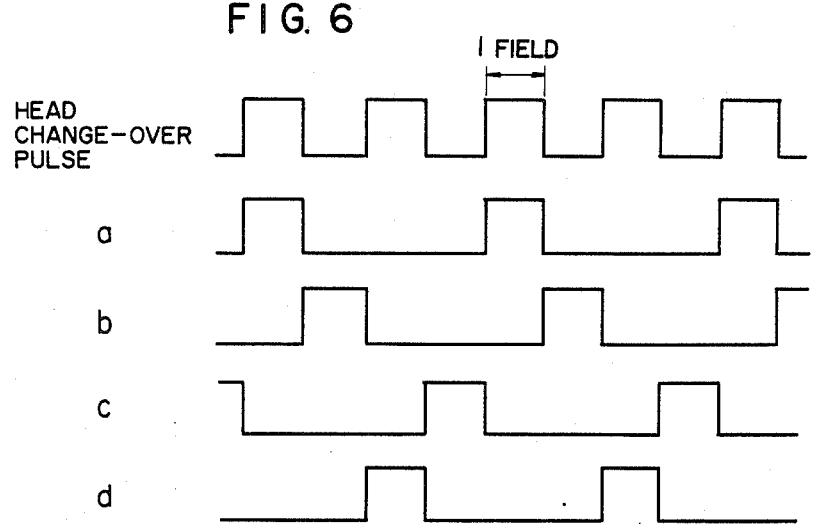

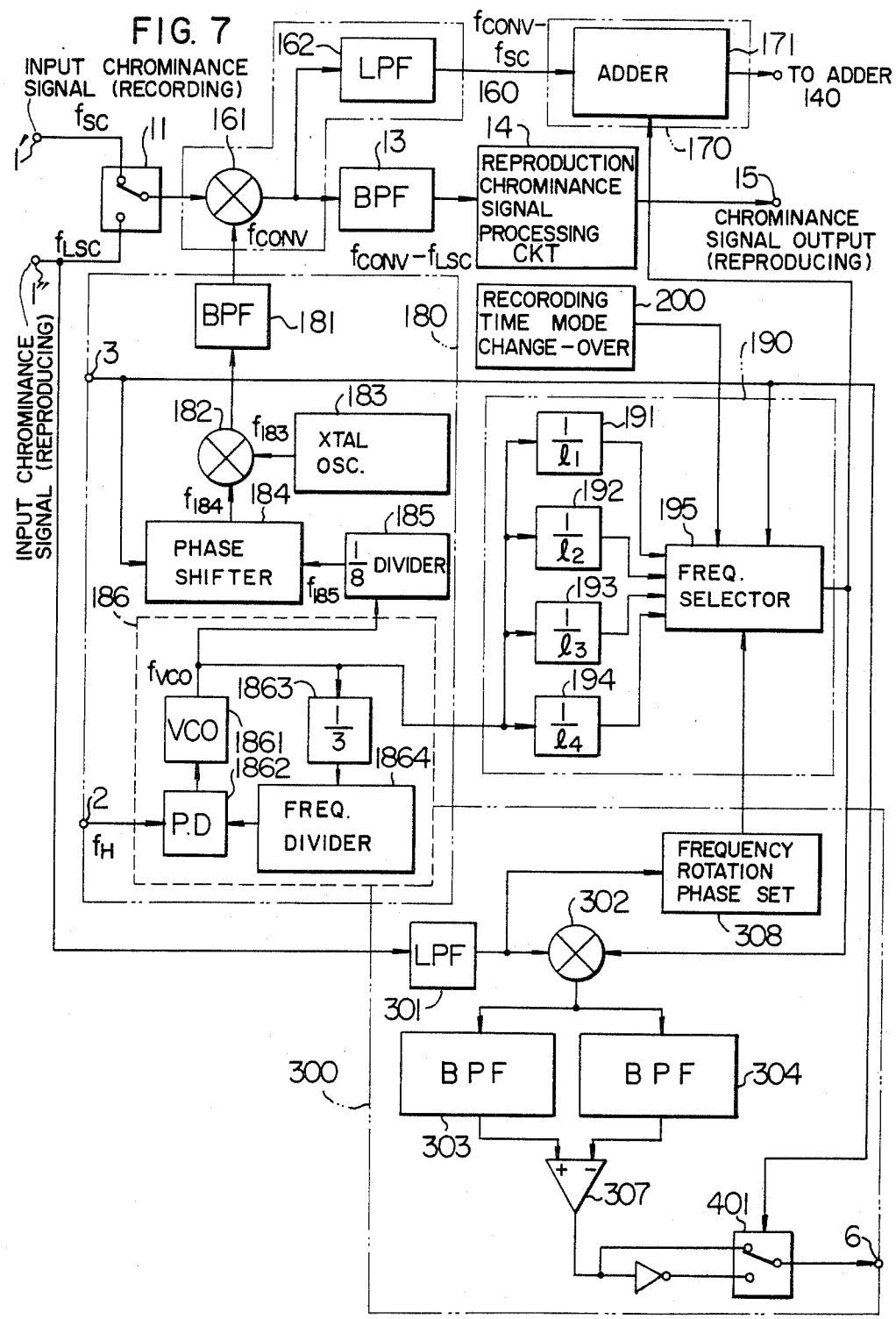

FIG. 20
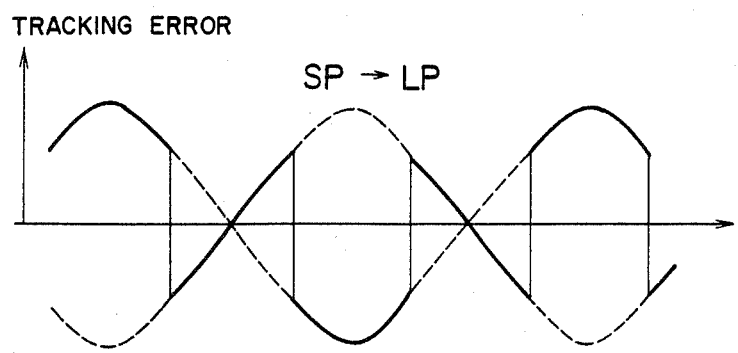
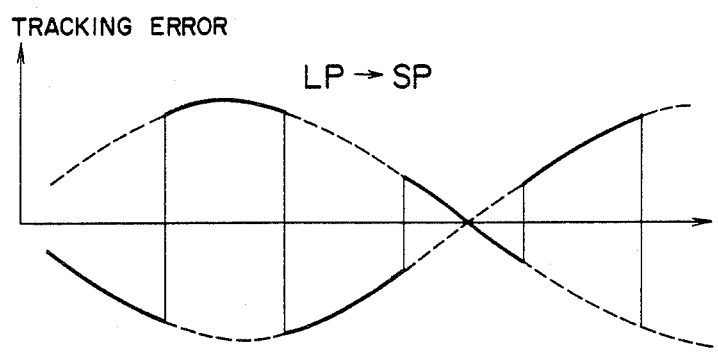
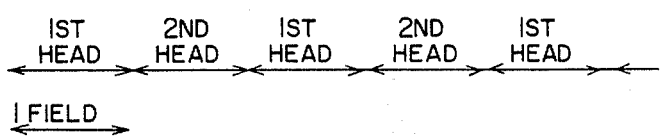

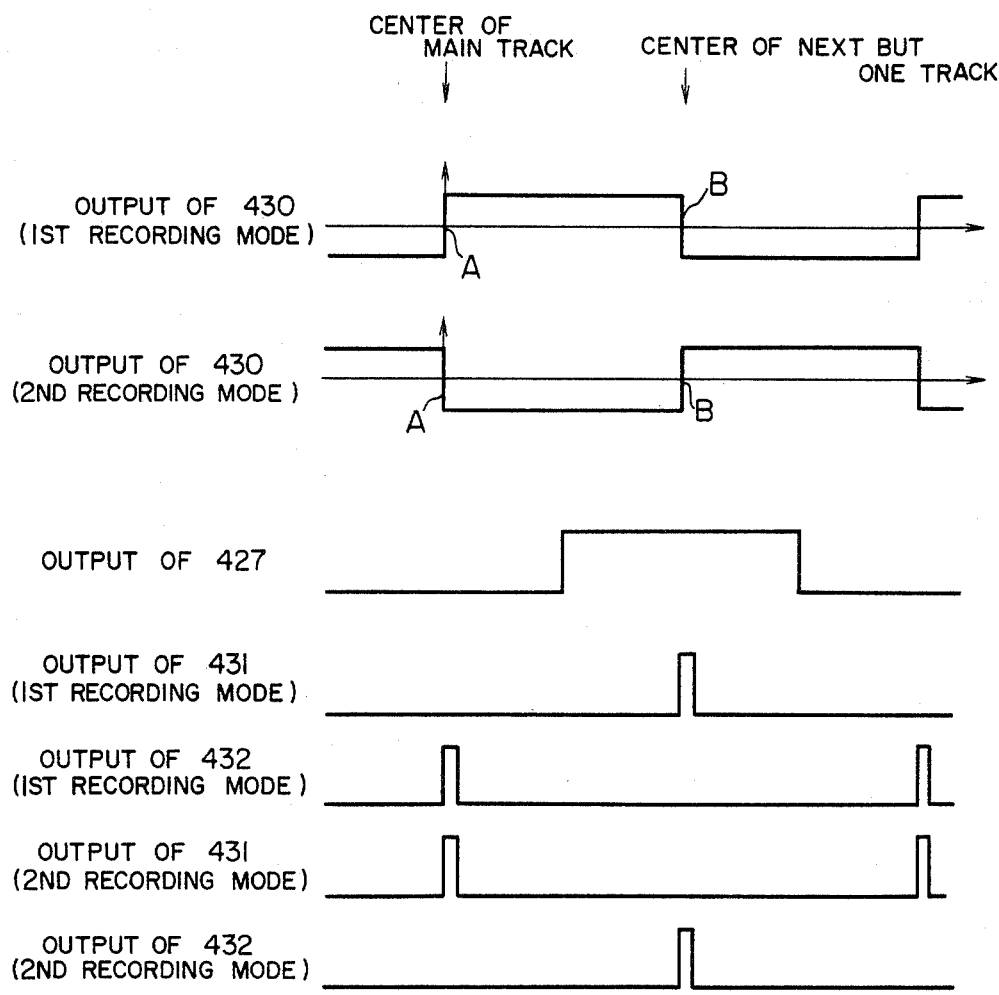

A1 B1 A2 B2 A3 B3 A4 B4

A1 B1 A2 B2 A3 B3 A4 B4

PILOT SIGNAL RECORDING POSITION

PILOT SIGNAL RECORDING POSITION

MAGNETIC VIDEO PILOT SIGNAL RECORDING/REPRODUCING SYSTEM

The present invention relates to a magnetic recording/reproducing system for a video tape recorder of the helical scanning type or the like, and in particular to a helical scanning type video tape recorder in which pilot signals may be recorded onto a video recording track in a multiplex manner or the pilot signals may be reproduced therefrom.

In one of the current video tape recorders for domestic use, the running speed of a cartridge tape is switched over between two values, for example, a standard speed and a half thereof, or changed over among three valves, for example a standard speed, a half thereof and one third thereof, so that the recording/reproducing time of the cartridge tape, for example a two-hours cartridge tape available on market, is switched between a standard mode (a standard tape speed) and a threefold time mode (a low tape speed) the time of which is three times as long as that of the standard mode. It is essential in this case that a tape has to be reproduced in the reproducing mode of the same tape speed as that of the recording mode in which the tape has been recorded.

In such a video tape recorder, when a tape previously recorded is reproduced, there may be a case where it is not clear that the tape has been recorded in a standard recording time mode or in a several times recording time mode. Generally, therefore, the recording time mode of a tape is automatically judged when the tape is reproduced so as to make the tape speed in reproducing agree with the tape speed in recording.

Conventionally, a control signal recorded on a control track different from a video track has been used for the recording-time mode judgement. That is, in this method, the recording-time mode is judged by using the fact that there is a difference in interval of the control pulse signals recorded onto a tape between in a standard recording-time mode and in a several times recording-time mode.

There are various drawbacks in such a method in which a tracking of recording track is made by using a control signal. A first one of the drawbacks is that it is required to provide a track and a head for the exclusive use for recording/reproducing the control signal. The second one is that it is necessary to exactly maintain the position of a head for recording/reproducing the control signal in order to keep the interchangeability of the recorded tape. The third one is that it is ineffective with respect to a high frequency track displacement such as a bend of recording track in the method utilizing a control signal.

To overcome the above-mentioned various drawbacks, a method has been proposed in which a pilot signal for tracking is recorded onto a recording track in place of the above-mentioned control signal and the tracking of the recording track is made by using the pilot signal.

In this method, however, no consideration has been made about the recording-time mode judgement and therefore such judgement can not be effected, while the above-mentioned drawbacks may be obviated.

An object of the present invention is to provide a magnetic recording/reproducing system in which automatic judgement of the tape recording-time mode can be made in any reproducing tape speed.

Another object of the present invention is to provide a magnetic recording/reproducing system in which the circuit configuration is simple and suitable to be realized as an integrated circuit, resulting in reduction in cost.

To attain the above-mentioned objects, according to the present invention, a pilot signal, for example a tracking pilot signal, is utilized for the judgement of the recording-time mode. The pilot signal is recorded onto a recording track in a multiplex manner together with an information (video) signal. The arrangement of recording of the pilot signals are changed in accordance with the recording-time mode.

According to the present invention, the recording-time mode can be automatically and surely judged in any reproducing tape speed.

The foregoing and other features of the invention will become apparent from the following detailed description of the invention when considered in conjunction with the accompanying drawings in which:

FIG. 2 is a block diagram of a recording system according to the present invention;

Figure 17:
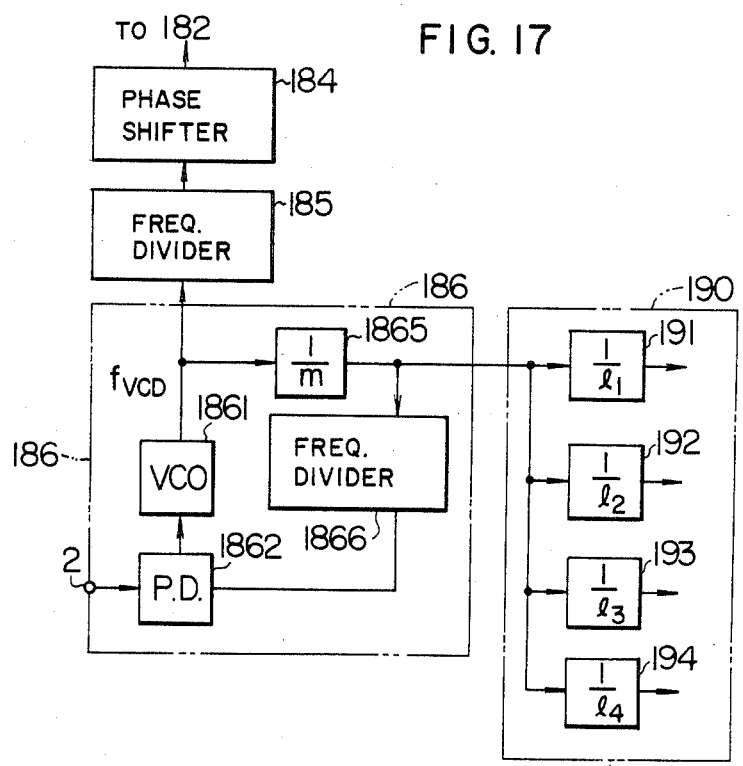
Figure 18:
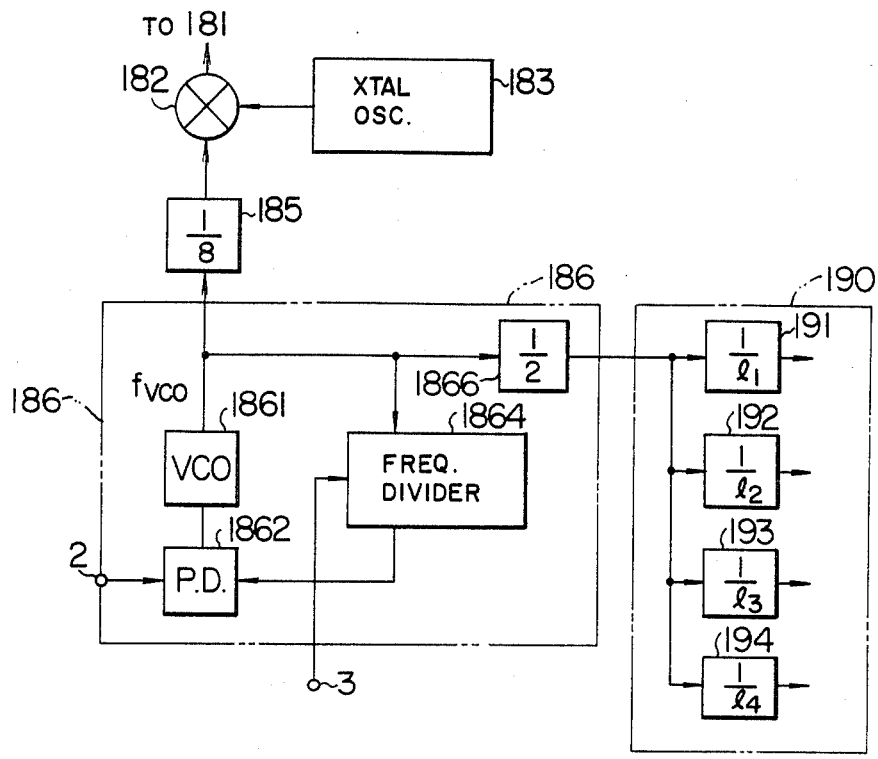
Figure 19:
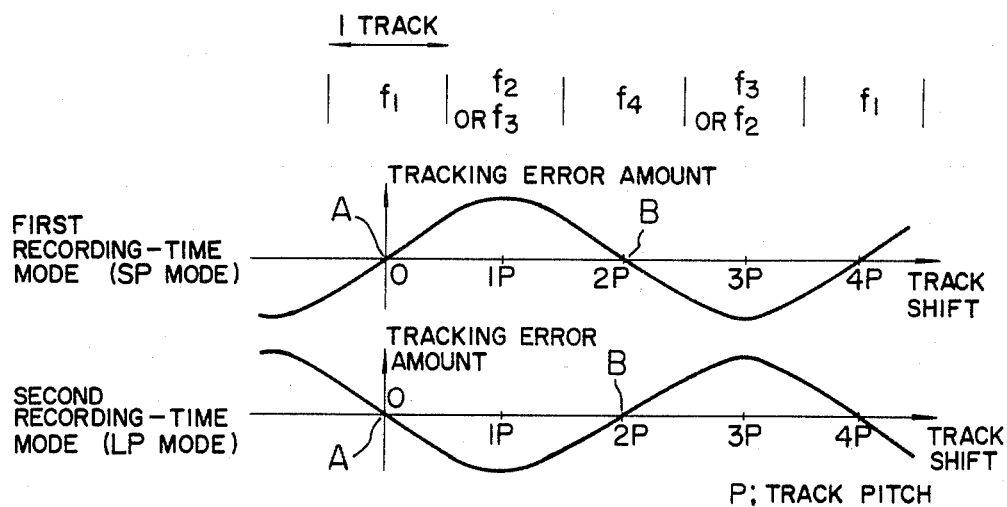
Figure 21:
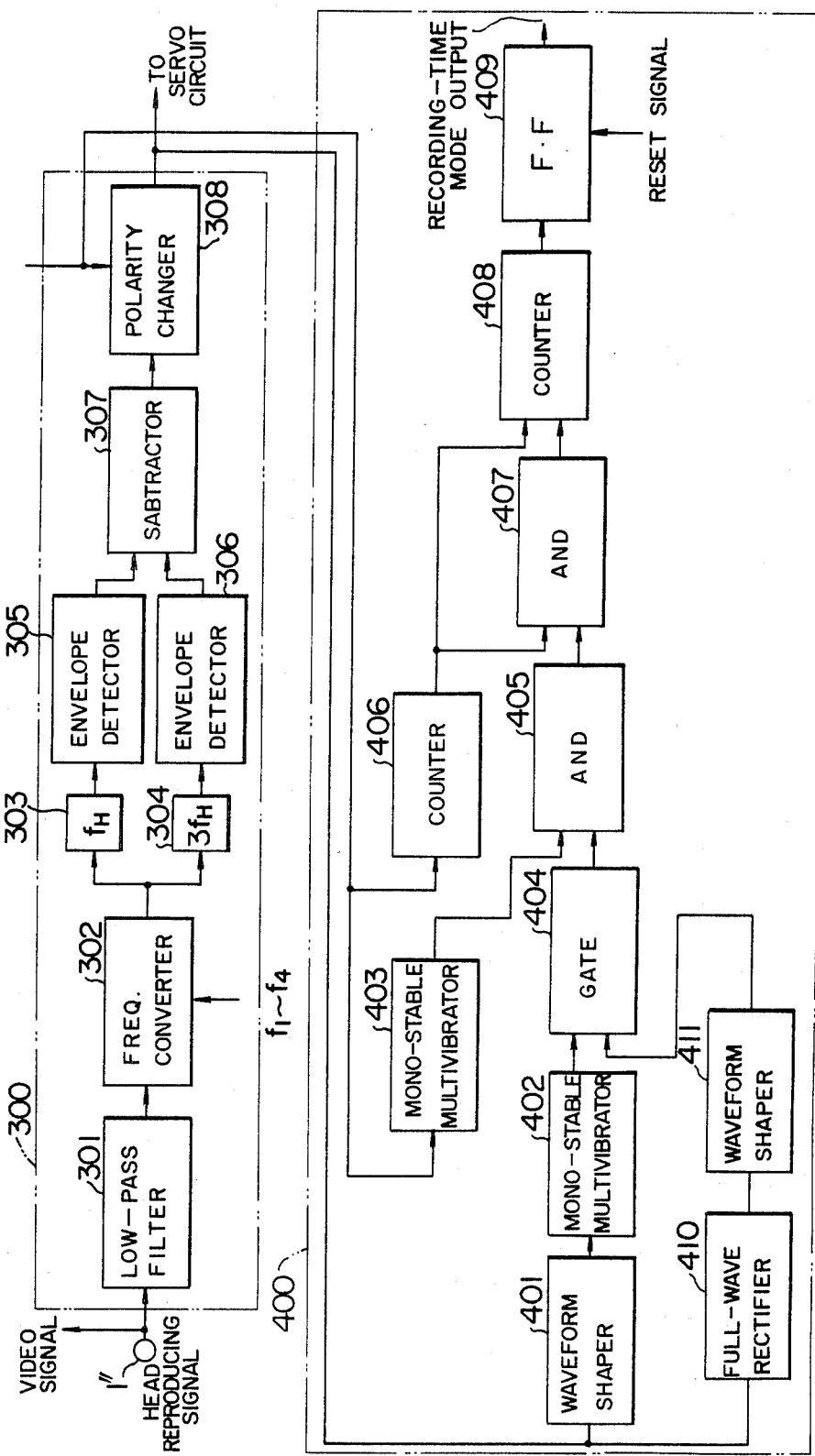
Figure 22:
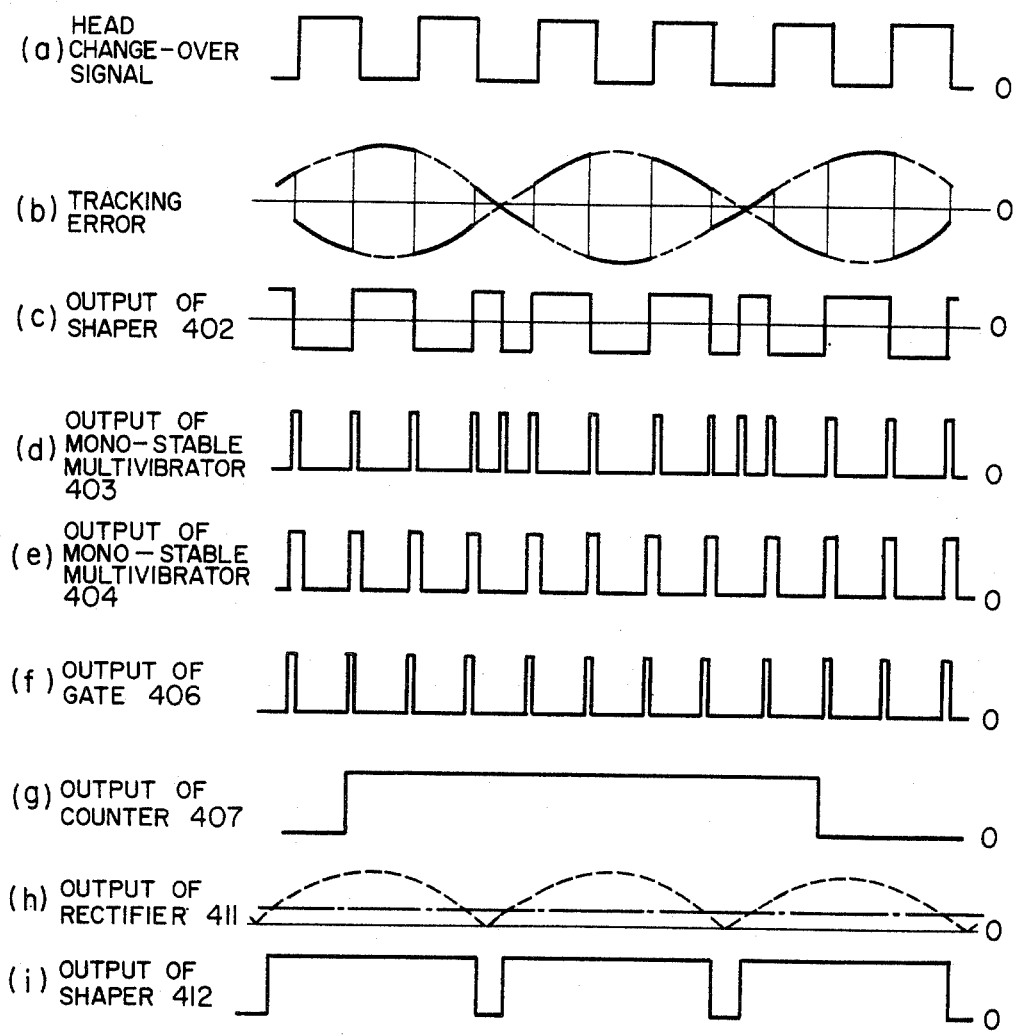
Figure 23:
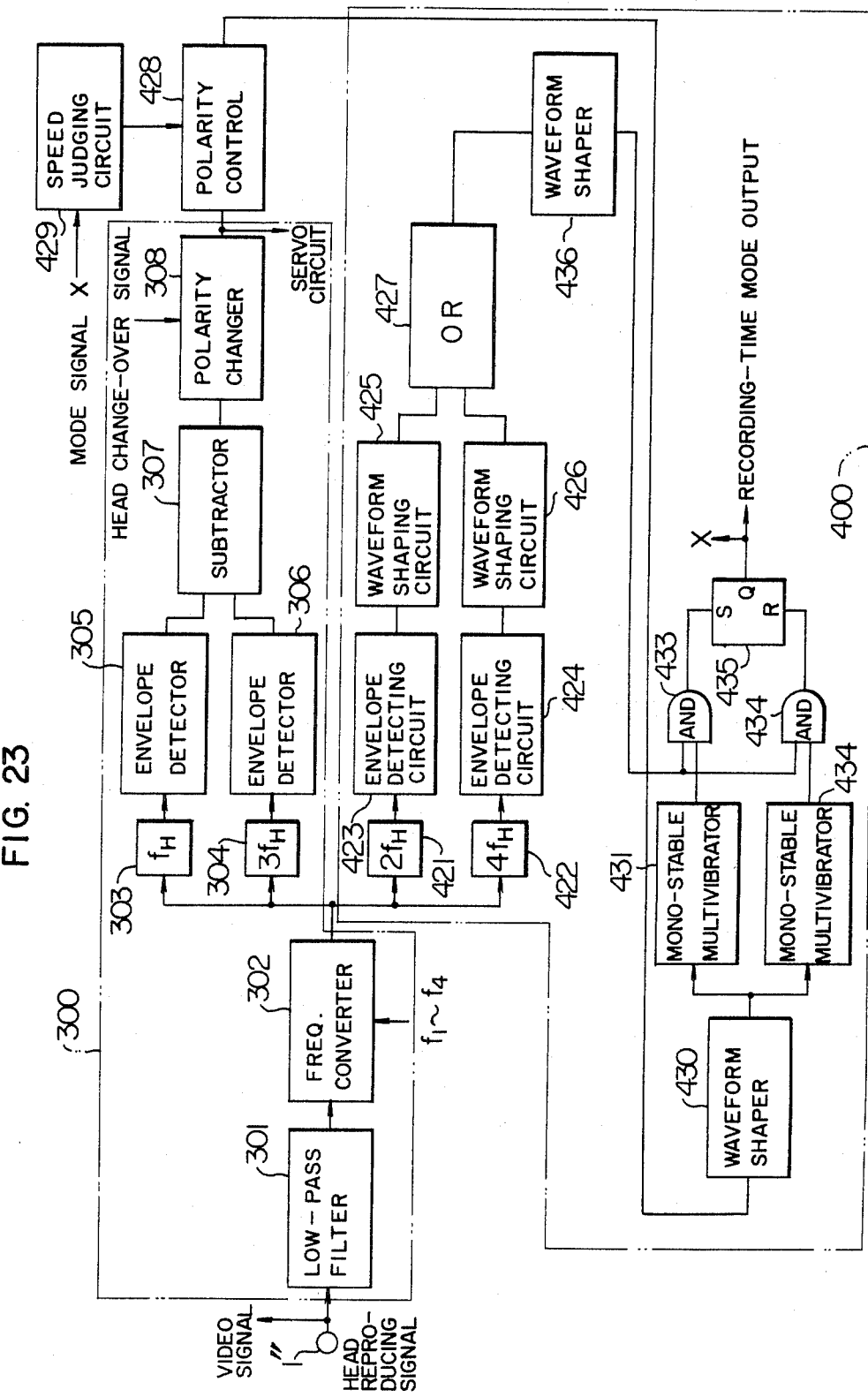
Figure 25A:
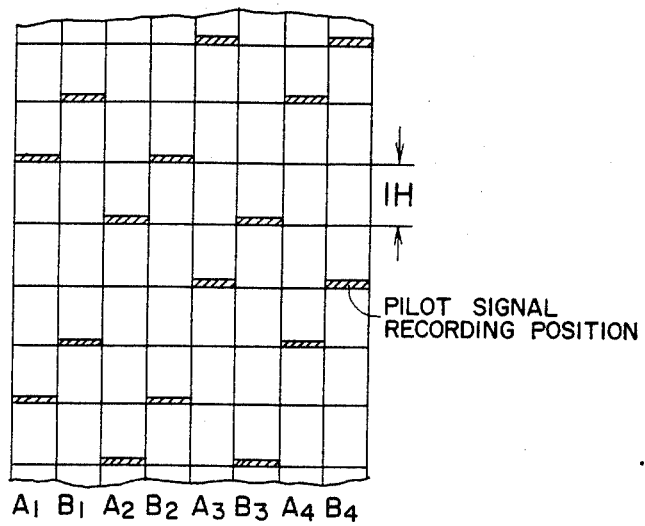
Figure 25B:
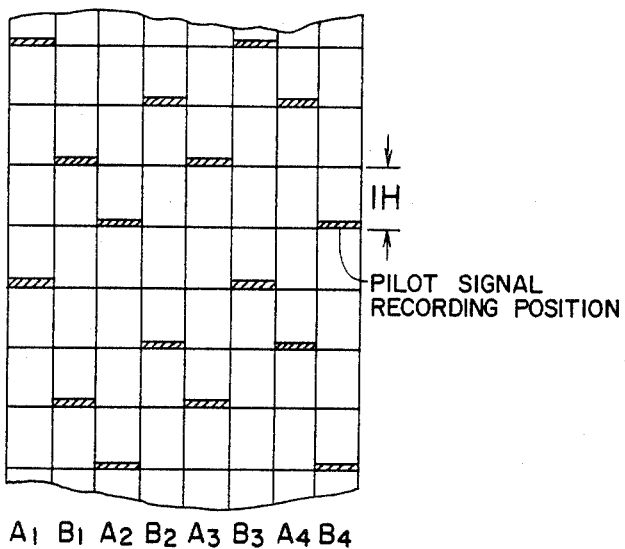
Figure 26:
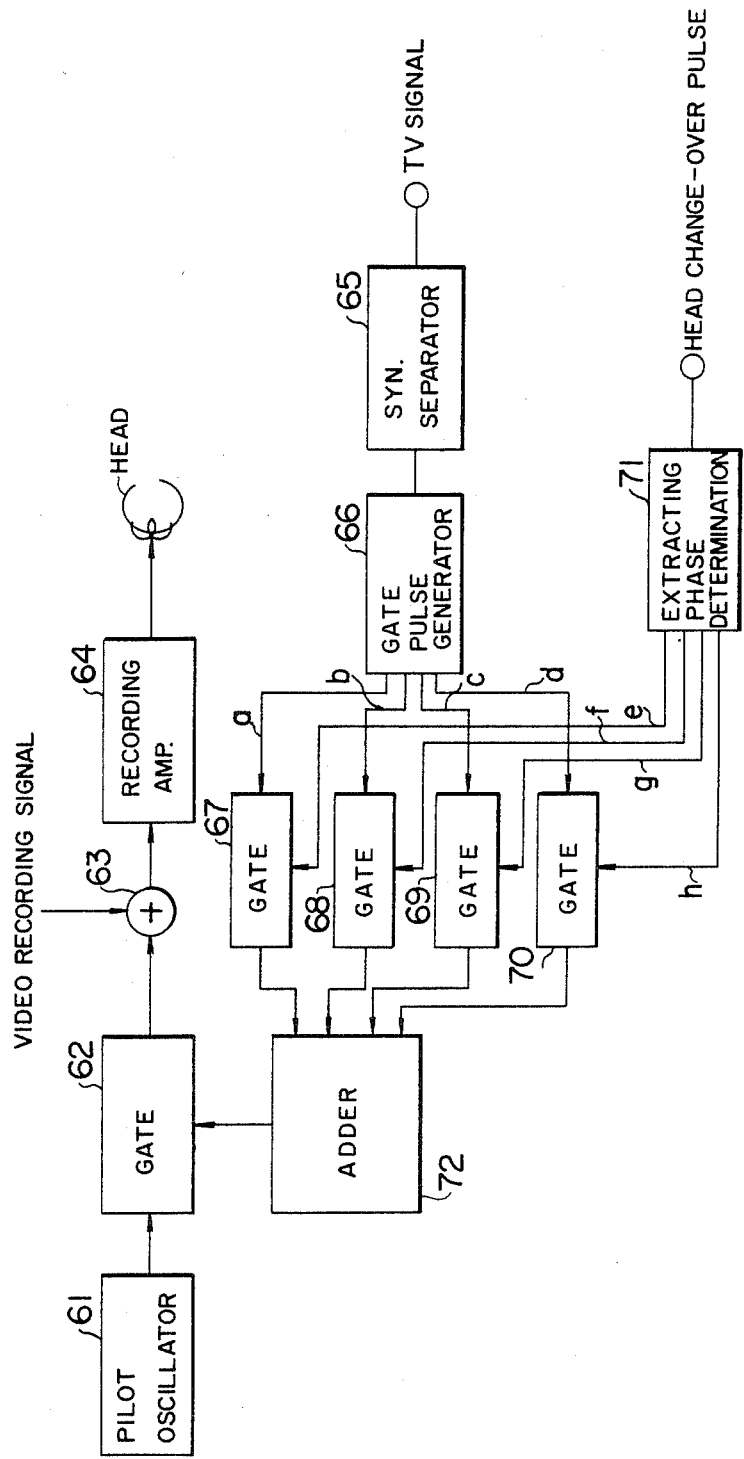
Figure 27:
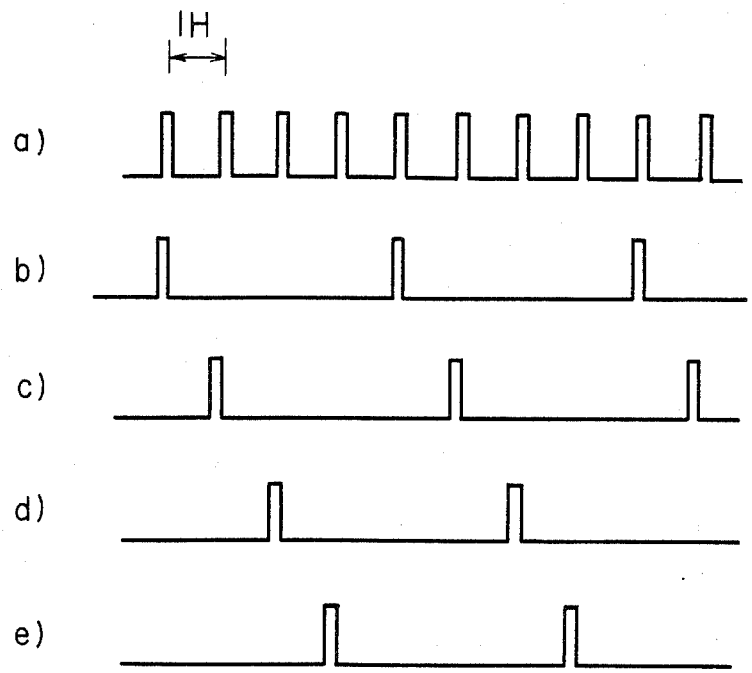
Figure 33:
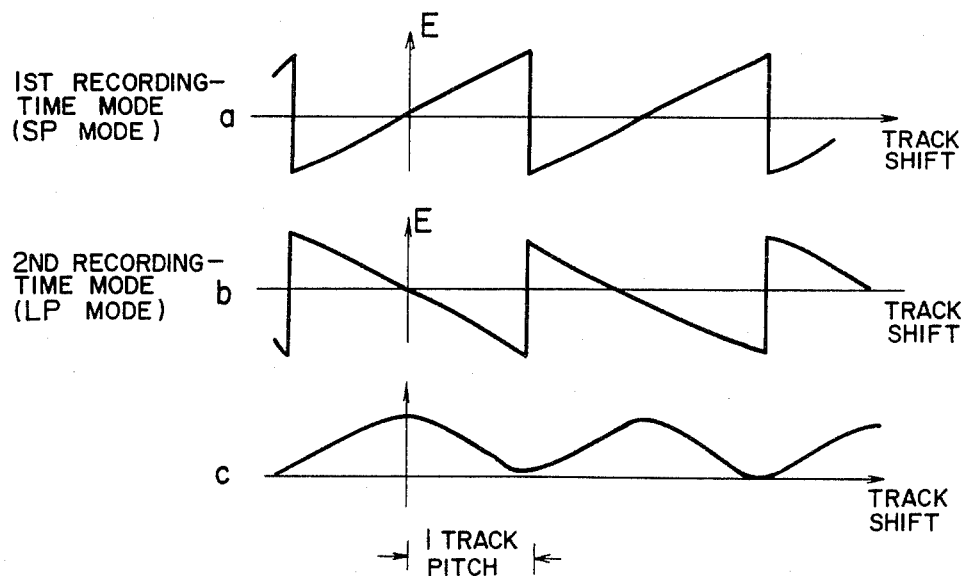
Figure 28:
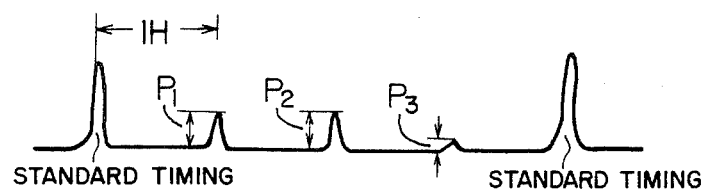
Figure 29:
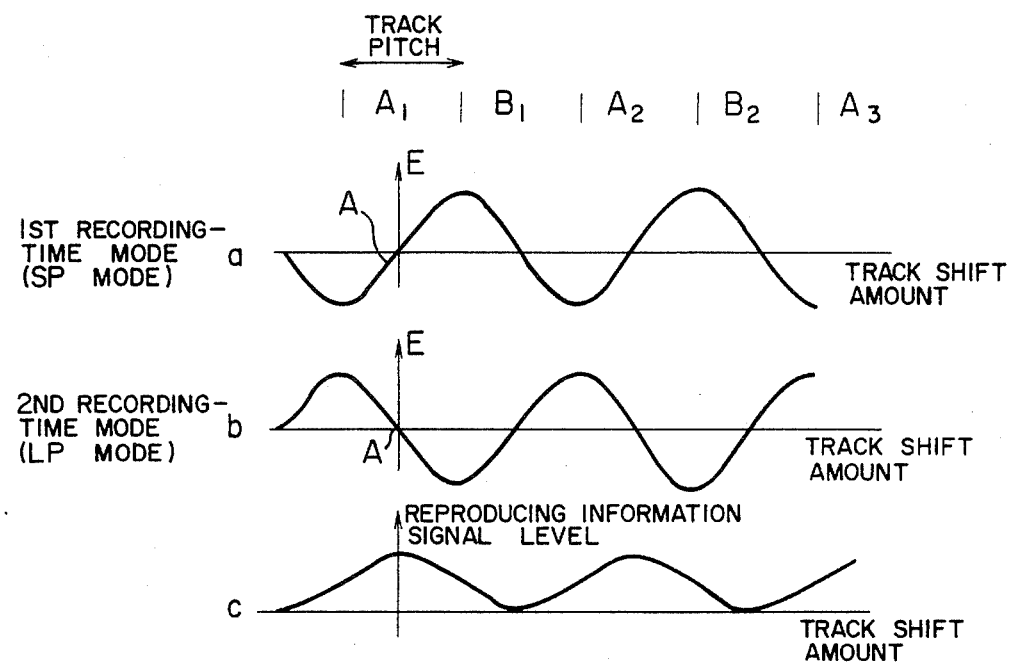
Figure 30:
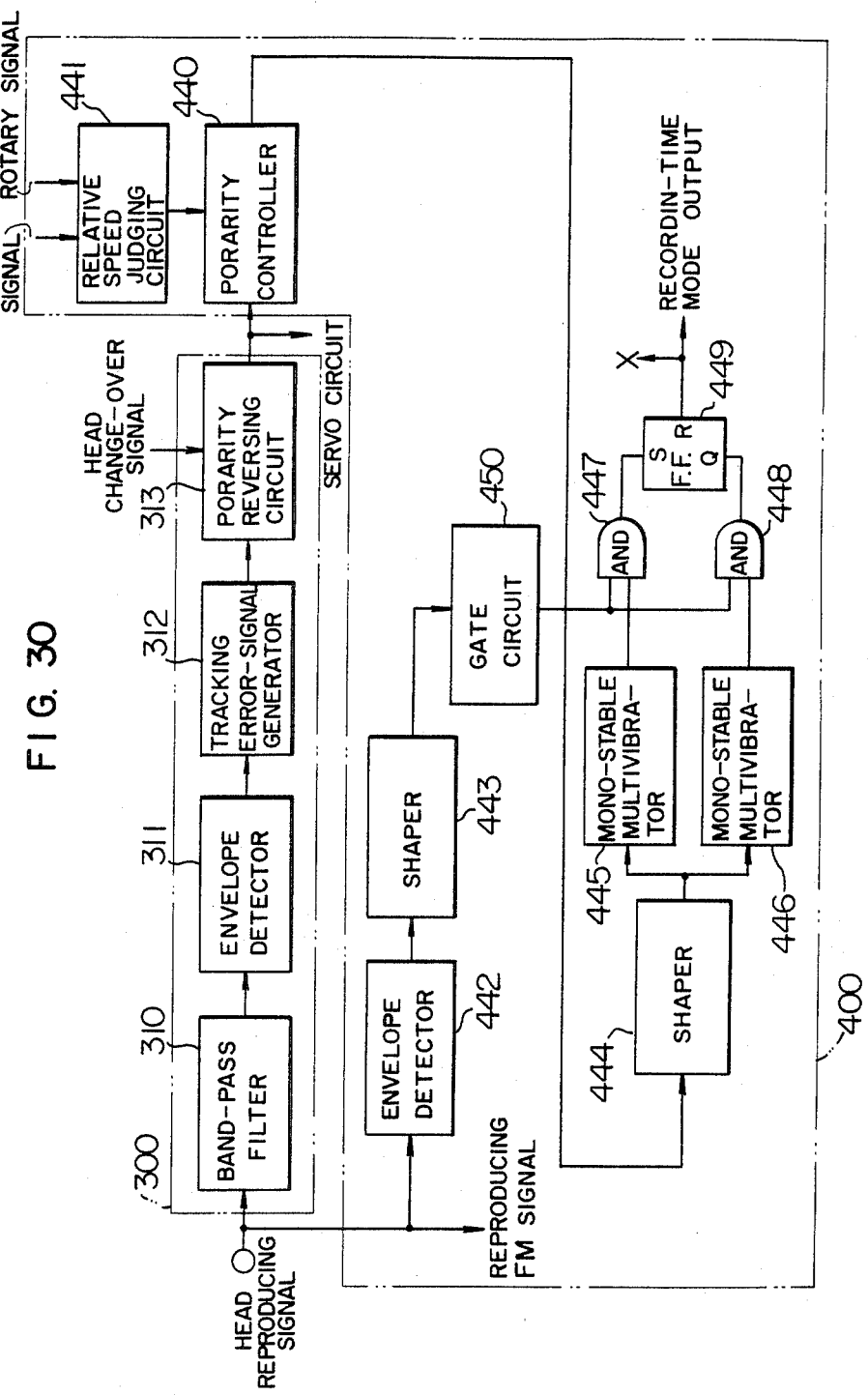
Figure 31:
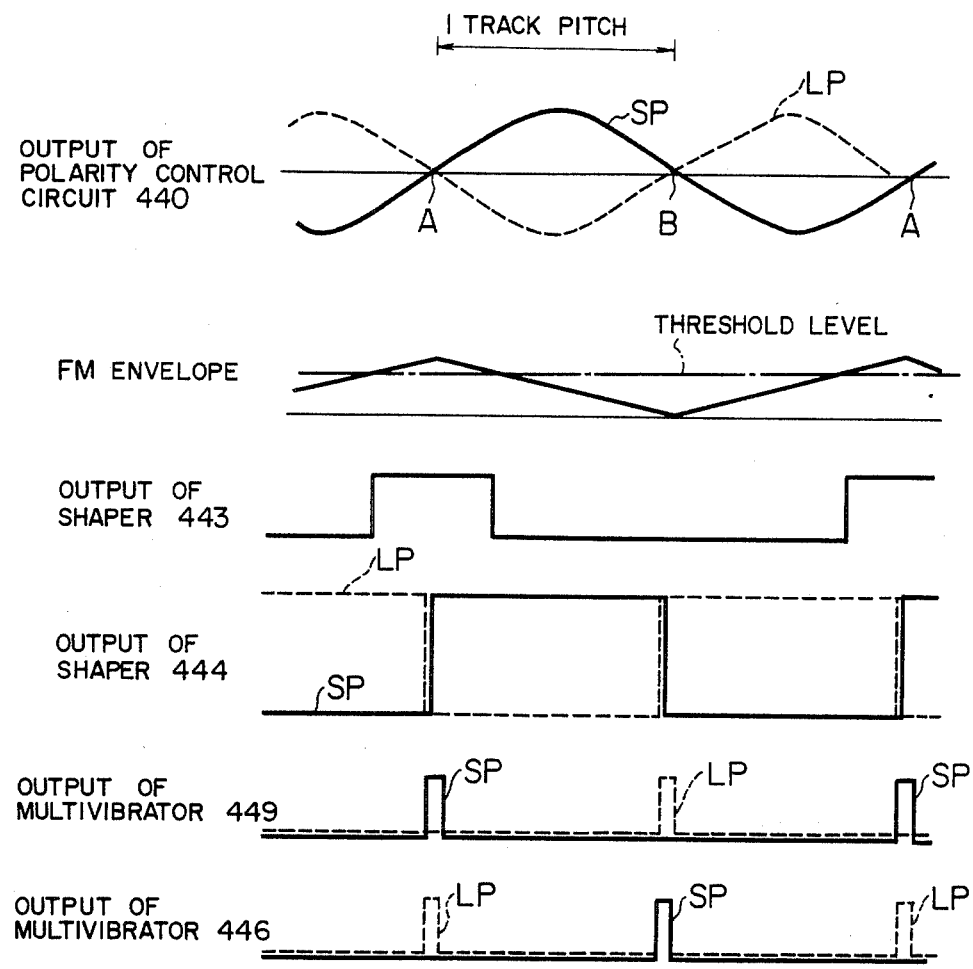
Figure 32A:
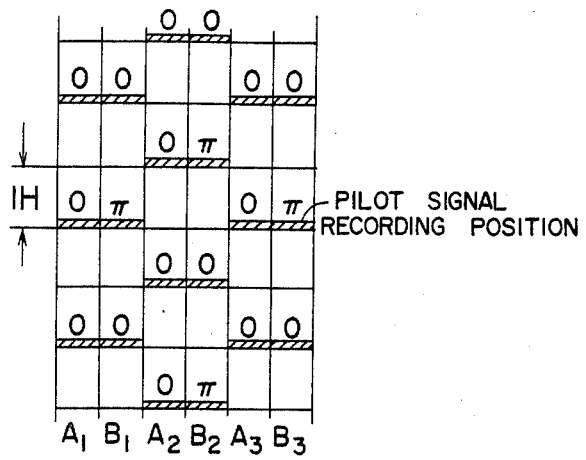
Figure 32B:
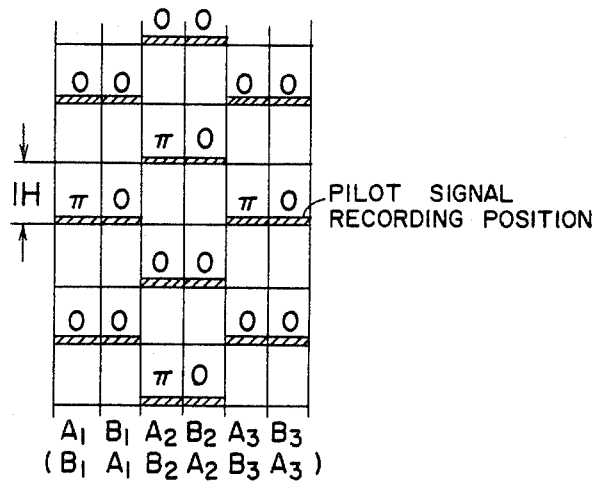

FIGS. 4, 5 and 6a–b are a tine chart, a block diagram and a time chart, respectively, for explaining the generation of the pilot signal;

FIG. 7 is a block diagram of a recording/reproducing system according to the present invention;

FIGS. 8–16 are block diagrams illustrating the relation between the pilot signal generating circuit and the local oscillation circuit according to the present invention;

FIGS. 17 and 18 are block diagrams illustrating embodiments of the phase synchronization circuit according to the present invention;

FIGS. 19 and 20 show waveforms for explaining the recording-time mode judgement in the four-frequency pilot system according to the present invention;

FIG. 21 is a block diagram illustrating an embodiment of the recording-time mode judging circuit in the four-frequency pilot system according to the present invention;

FIG. 22, consisting of (a)–(i), is a time chart illustrating waveforms for explaining the FIG. 21 embodiment;

FIG. 23 is a block diagram of another embodiment of the recording-time mode judging circuit;

FIG. 24 is a time chart illustrating waveforms for explaining the FIG. 23 embodiment;

FIGS. 25A and 25B are diagrams illustrating another example of recording pattern according to the present invention;

FIG. 26 is a block diagram of the recording system for the example of FIGS. 25A and 25B;

FIG. 27, consisting of (a)–(e), is a time chart illustrating waveforms for explaining the FIG. 26 embodiment;

FIGS. 28 and 29 show waveforms for explaining the principle of the recording-time judgement in the one-frequency pilot system according to the present invention;

FIG. 30 is a block diagram illustrating the recording-time mode judging circuit based on the FIG. 29 principle;

FIG. 31 is a time chart illustrating waveforms for explaining the FIG. 30 embodiment;

FIGS. 32A and 32B show a further example of recording pattern according to the present invention; and FIG. 33 consisting of a-c shows waveforms for explaining the recording-time mode judgement of the above examples.

Preferred embodiments of the present invention will be described hereunder.

Figure 1A:
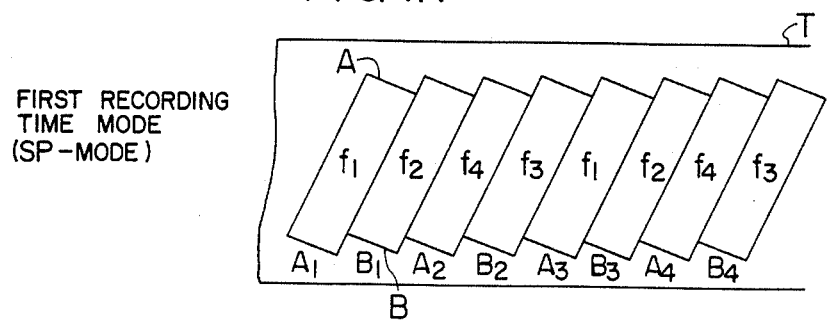
FIGS. 1A and 1B are schematic diagrams showing an example of recording pattern according to the present invention.
Figure 1B:
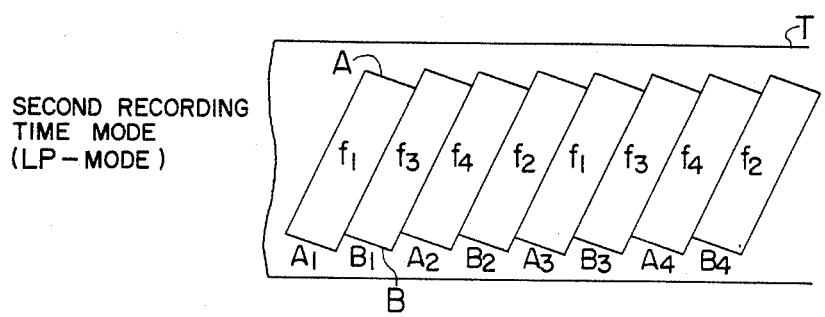

FIGS. 1A and 1B show an example of recording pattern according to the present invention in which a pilot signal is recorded on the recording tracks A and B with four frequencies $f_1$-$f_4$ with an arrangement as shown in each of FIGS. 1A and 1B, in a rotary 2-heads helical scanning type video tape recorder. Such a recording method is hereinafter referred to as "four-frequency pilot recording system". In particular, FIG. 1A shows the recording pattern in a first recording time mode or standard play mode (hereinafter abbreviated as SP-mode) in which the pilot signal is recorded with the respective frequencies $f_1$, $f_2$, $f_4$ and $f_3$ successively in this order or rotation onto the recording track A together with the video signal in a multiplex manner. Similarly to this, FIG. 1B shows the recording pattern in a second recording-time mode or long play mode (hereinafter abbreviated as LP-mode) in which the pilot signal is recorded with the respective frequencies $f_1$, $f_3$, $f_4$ and $f_2$ successively in this order or rotation onto the recording track B together with the video signal in a multiplex manner. It is to be noted that the relation between the respective recording arrangements of the four frequencies of pilot signal in the first and second recording-time modes is mirror symmetrical. the term "mirror symmetry" means that, for example, the arrangement of frequencies of the pilot signal when FIG. 1A is viewed in a mirror has a reverse order (the order $f_3$, $f_4$, $f_2$, $f_1$, $f_3$ - - - ) which is the same as the arrangement of frequencies of the pilot signal of FIG. 1B (the order $f_1$, $f_3$, $f_4$, $f_2$, $f_1$ - - - ). By causing the respective arrangements of frequencies of the pilot signals in the first and second recording-time modes to be mirror symmetric with respect to each other, it becomes possible to judge the recording-time mode as will be described later. In a video tape recorder for home use, the frequencies of the pilot signal are set below the frequency band of the color signal which has been subject to low-frequency conversion In FIGS. 1A and 1B, T represents a magnetic tape, $A(A_1, A_2 - - -)$ represents a first channel recording track formed by a first rotary magnetic head (not shown) and $B(B_1, B_2 - - -)$ represents a second channel recording track formed by a second rotary magnetic head (not shown) which is arranged wih a rotary interval of 180° with respect to the first rotary magnetic head.

A recording/reproducing system will be now described. Explanation will be made first about a recording system. FIG. 2 is a block diagram illustrating an embodiment of the recording system according to the present invention. In FIG. 2, a color video signal received at a video signal input terminal 1 is separated, as known well, by a filter 110 into a luminance signal Y and a chrominance signal C. The luminance signal Y is subject to frequency modulation by a frequency modulator (FM) 130 and then applied to an adder circuit 140 at the next stage. The chrominance signal C is mixed in a frequency conversion circuit 160 with an oscillation signal $f_{CONV}$ produced by a local oscillator circuit 180 so as to be converted into a low-frequency signal C'.

The local oscillator circuit 180 oscillates to produce frequency based on a horizontal synchronizing signal received at a horizontal synchronizing pulse input terminal 2. A pilot signal generating circuit 190 receives an output signal from the local oscillator circuit 80 so as to produce a pilot signal P, as will be described later. The pilot signal P is added to the low-frequency converted chrominance signal C' in another adder circuit 170. The resulting signal in the adder 170 is applied to the adder circuit 140 and added thereat to the FM luminance signal from the FM circuit 130. Alternatively, the chrominance signal C' and the pilot signal P may be supplied directly to the adder circuit 140 so as to be added thereat to the FM luminance signal.

The resulting signal in the adder circuit 140 is supplied to a recording head device through a recording amplifier 150, etc. so as to be recorded onto a magnetic tape in a well-known manner.

Figure 3:
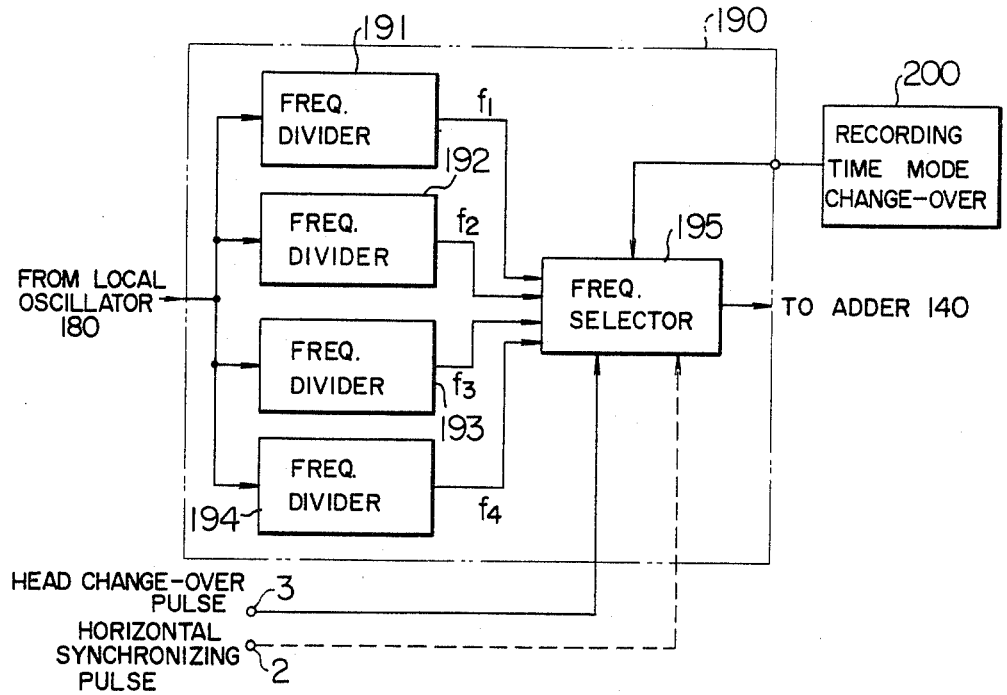
FIG. 3 is a block diagram for explaining a pilot signal generating method according to the present invention.

A pilot signal producing method will be now described by referring to FIGS. 3 and 4. FIG. 3 is a block diagram illustrating an embodiment of a 4-frequency pilot signal generating circuit 190. In FIG. 3, frequency dividers 191, 192, 193 and 194 divide the output signal from the local oscillator circuit 180 with appropriate dividing ratio's into portions of frequencies $f_1$, $f_2$, $f_3$ and $f_4$ of a pilot signal P, respectively. A frequency selector circuit 195 connected to the frequency dividers 191 to 194 receives a head change-over pulse as shown in FIG. 4(a) so as to select, every field, the frequency portions $f_1$, $f_2$, $f_3$ and $f_4$ in response to a recording-time mode signal, which takes high(H) or low(L) level, produced by a recording time changing-over device 200 so as to arrange them as shown in FIG. 4(b) and FIG. 4(c) when the recording time mode signal indicates the first recording time mode (SP-mode) and the second recording time mode (LP-mode) respectively. The only difference between the respective arrangements of FIG. 4(b) and FIG. 4(c) is that the portions of frequency $f_2$ and $f_3$ of the pilot signal P are interchanged. Accordingly, it will do to interchange for one another only the portions of frequencies $f_2$ and $f_3$ of the pilot signal P produced by the respective dividers 192 and 193 and applied to the frequency selector circuit 195, in response to the recording-time mode signal. Thus, it becomes possible to change-over the recording pattern by means of simple means. An embodiment of such a changing-over means will be briefly described here by referring to FIGS. 5 and 6.

Figure 5:
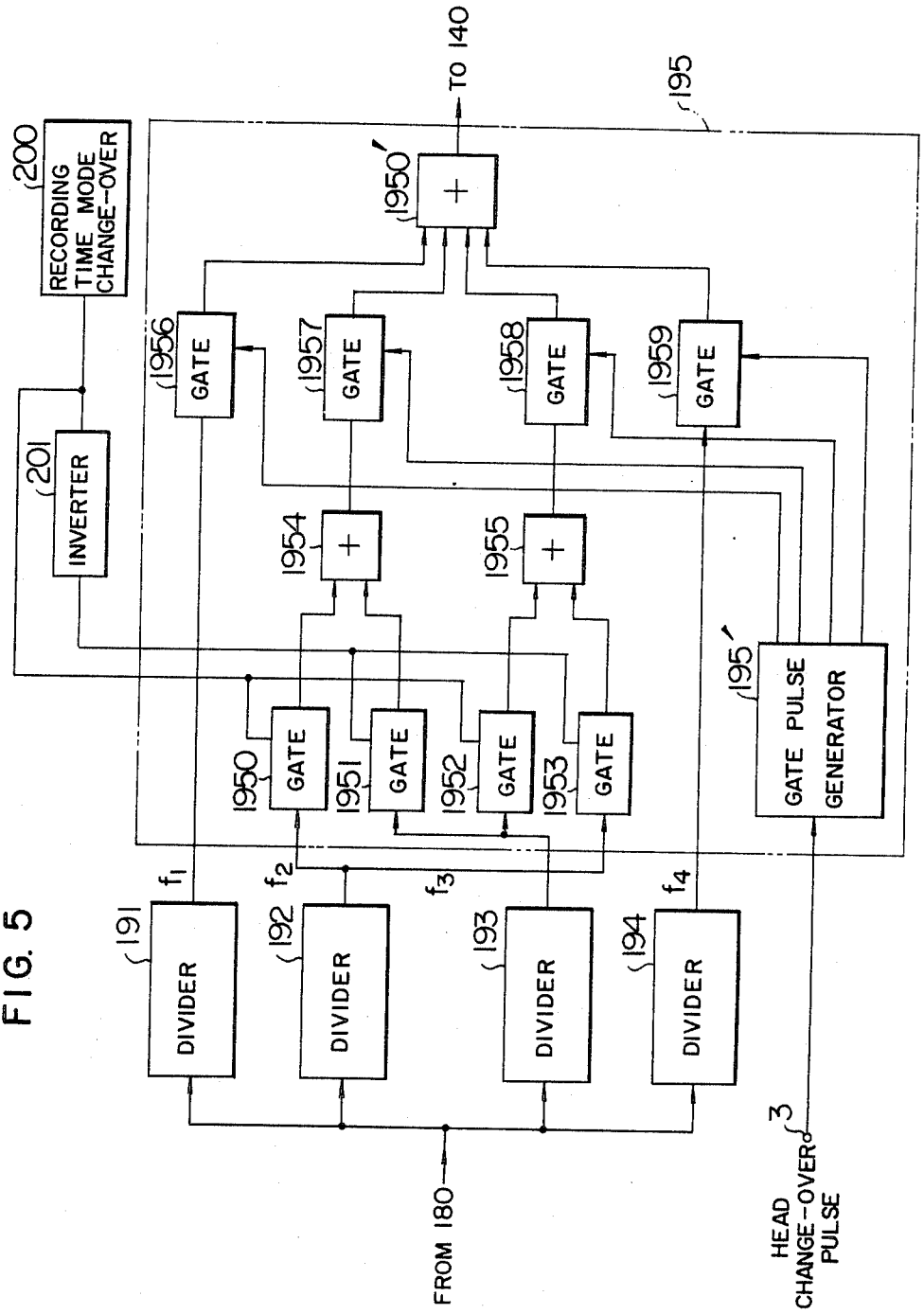

In FIG. 5, the portions of frequencies $f_2$ and $f_3$ of the pilot signal P produced by the respective dividers 192 and 193 are supplied to the pair of analog gate circuits 1950 and 1953 and another pair of analog gate circuits 1951 and 1952, respectively. The recording-time mode signal produced by the mode changing-over device 200 is in a digital form and takes, for example, its H-level in the SP-mode and its L-level in the LP-mode, respectively. The recording-time mode signal is applied to an inverter 201 and reversed in polarity thereat. The respective outputs of the recording-time mode changing-over device 200 and the inverter 201 are applied as gating signals to the pair of analog gate circuits 1950 and 1952 and the pair of analog gate circuits 1951 and 1953. Each of these gate circuits 1950 and 1953 is enabled to pass the received signal as it is when the gating signal is in its H-level and disabled from passing the signal when the gating signal is in its L-level. The outputs of the analog gate circuits 1950 and 1951 are added each other in an adder circuit 1954. The outputs of the analog gate circuits 1952 and 1953 are added to each other in another adder 1955. Accordingly, the output frequency of the adder circuit 1954 is $f_2$ in the SP-mode and $f_3$ in the LP-mode. The output frequency of the adder circuit 1955 is $f_3$ in the SP-mode and $f_2$ in the LP-mode. The outputs of the divider 191, the adder circuits 1954, 1955 and the divider 194 are supplied to analog gate circuits 1956, 1957, 1958 and 1960, respectively. The head changing-over signal is applied to a gate pulse generating circuit 195' so that four kinds of gating signals a, b, c and d are produced therefrom. FIG. 6 is a time chart showing the four kinds of gating pulses a, b, c and d with respect to the head changing-over pulse. These gating pulses are different in phase one from another and each of them takes H-level only one of four field periods. These gating signals a, b, c and d are respectively led to the analog gate circuits 1956, 1957, 1958 and 1959 each of which produces a pilot signal only when the gating signal applied thereto is in its H-level. The outputs of the analog gate circuits 1956, 1957, 1958 and 1959 are supplied to a further adder circuit 1950'. The output of the adder circuit 1950' is the recording pilot signal which is produced in the sequence as shown in FIG. 4(b) and FIG. 4(c).

Next, the pilot signal generating circuit 190 and the local oscillation circuit 180 in the recording system are explained. FIG. 7 is a block diagram showing an embodiment of these circuits 180 and 190. Although components of the reproducing system are also shown in FIG. 7, they will be explained later in detail and those of the recording system will be mainly described here.

In FIG. 7, the reference numeral 1' denotes an input terminal for receiving a recording chrominance signal of frequency $f_{SC}$, 1'' denotes an input terminal for receiving a reproducing chrominance signal of frequency $f_{LSC}$, 11 denotes a switching circuit which is switched in the position as shown in the drawing during the recording operation, 180 denotes a local oscillation circuit for producing a carrier signal of frequency $f_{CONV}$, and 160 denotes a frequency conversion circuit for providing a signal of frequency ($f_{CONV}+f_{SC}$) and a signal of frequency ($f_{CONV}-f_{SC}$) during the recording operation and a signal of frequency ($f_{CONV}-f_{LSC}$) and a signal of frequency ($f_{CONV}+f_{LSC}$) during the reproducing operation. The frequency conversion circuit 160 is constituted by a frequency converter 161 and a low-pass filter (hereinafter abbreviated as LPF) 162 for deriving the above-mentioned low-frequency converted chrominance signal of frequency ($f_{CONV}-f_{SC}$). The reference numeral 170 denotes an adder circuit for adding the low-frequency converted chrominance signal and a pilot signal described later to each other, and 186 denotes a phase locked loop circuit (hereinafter abbreviated as PLL circuit) for producing a carrier signal $f_{VCO}$ of frequency $Nf_H$ (where N is an integer and $f_H$ is a horizontal scanning frequency). The PLL circuit 186 is constituted by a voltage control oscillator 1861 (hereinafter abbreviated as VCO) with an oscillation frequency $Nf_H$, a first and a second frequency divider circuits 1863 and 1864, and a phase detector 1862. The reference numeral 2 denotes an input terminal for receiving a horizontal synchronizing pulse, 185 denotes a ⅛ frequency divider circuit, 184 denotes a phase shifter circuit, 183 denotes a crystal (Xtal) oscillator which oscillates with the same frequency $f_{183}$ as that of a chrominance subcarrier of the chrominance signal $f_{SC}$, 182 denotes a frequency converter in which the frequency $f_{183}$ from the Xtal oscillator 183 is mixed with the frequency $f_{184}$ from the phase shifter circuit 184 so as to produce a signal of frequency ($f_{183}+f_{184}$) and a signal of frequency ($f_{183}-f_{184}$), the frequency $f_{184}$, being the same as the frequency $f_{185}$ and therefore the same as the frequency of the low-frequency converted chrominance subcarrier, and 181 denotes a band-pass filter (hereinafter abbreviated as BPF) allowing the signal of frequency $f_{CONV}=f_{183}+f_{184}$ to pass therethrough. The local oscillation circuit 180 is constituted by the BPF 181, the frequency converter 182, the Xtal oscillator 183, the phase shifter 184, the divider 185 and the PLL circuit 186. The phase shifter circuit 184 is so as to satisfy both the conditions for the low-frequency converted chrominance signal frequency (therefore the output frequency of LPF) $f_{LSC}$ that "it has an offset of an odd multiple of ¼$f_H$ for every line (one horizontal period)" and that "it has an offset of an odd multiple of ½$f_H$ between fields" in the case of NTSC system, and both the conditions for the same that "it has an offset of an odd multiple of ⅛$f_H$ for every line (one horizontal period)" and that "it has an offset of an odd multiple of ¼$f_H$ between fields" in the case of CCIR system.

The reference numerals 191 to 194 denote frequency dividing circuits commonly connected to the output of the VCO 1861 of the local oscillation circuit 180 so as to divide the output frequency $f_{VCO}$ of the VCO 1861 to respectively produce the frequencies $f_1$, $f_2$, $f_3$ and $f_4$ of the pilot signal. The reference numeral 195 denotes a frequency selector circuit connected to the dividing circuits 191 to 194 for selecting the respective divided frequencies (of the pilot signal) respective produced by the dividing circuits 191 to 194. The divider circuits 191 to 194 and the frequency selector circuit 195 constitute a pilot signal generating circuit 190. The frequency selector circuit 195 selects the output frequencies $f_1$ to $f_4$ of the dividing circuits 191 to 194 in a predetermined order sequentially for every field, for example as shown in FIG. 1A, the frequency $f_1$ in the first field, the frequency $f_2$ in the second field, the frequency $f_4$ in the third field and the frequency $f_3$ in the fourth field, in accordance with the head changing-over pulse signal received at an input terminal 3. It is preferable to select the frequencies $f_1$ to $f_4$ selected by the selector circuit 190 to be lower than the frequency band of the low-frequency converted chrominance signal, for example $f_1 \approx 6.5\ f_H$, $f_2 \approx 7.5\ f_H$, $f_3 \approx 9.5\ f_H$ and $f_4 \approx 10.5\ f_H$.

Further, the recording pilot signal is to be set so as to satisfy the following conditions:

Each of the four frequencies $f_1$–$f_4$ of the pilot signal
(1) has an offset of 0.2 $f_H$–0.7 $f_H$, and
(2) has the relation of $$f_1 - f_2 \simeq f_3 - f_4 \simeq mf_H$$

$$f_1 - f_3 \simeq f_2 - f_4 \simeq nf_H$$

where $m \neq n$;
In the case of NTSC system, the low-frequency converted signal (the LPF 162 output frequency $f_{162}=f_{LSC}$)
(3) has an offset of an odd multiple of ¼$f_H$ for every line, and
(4) has an offset of an odd multiple of ½$f_H$ between fields; and
In the case of CCIR system, the low-frequency converted signal (the LPF 162 output frequency $f_{162}=f_{LSC}$)
(5) has an offset of an odd multiple of ⅛$f_H$ for every line, and
(6) has an offset of an odd multiple of ¼$f_H$ between fields.

In the embodiment of the present invention shown in FIG. 7, in order to satisfy the above-mentioned condition's (4) and (6), a one-track phase invert (PI) system wherein the recording low frequency converted signal is phase-inverted every line (one horizontal period) only in one side field or a both track phase-shifting system wherein each field is phase-shifted by 90° every line (one horizontal period) and the direction of phase-shifting is inverted every field, is utilized so that the low-frequency converted signal has an offset of $\frac{1}{2}f_H$ between fields in the case of NTSC system, while a one-track PS system wherein the recording low-frequency converted chrominance signal is phase-shifted by 90° every line only in one side field is utilized so that the low-frequency converted signal has an offset of $\frac{1}{4}f_H$ between fields in the case of CCIR system.

Further, the fact that the other conditions (1), (2), (3) and (5) are also satisfied in the FIG. 7 embodiment will be explained.

The case of NTSC system will be first described. Assume now that the oscillation frequency $f_{VCO}$ of the VCO 1861 in the PLL circuit 186 is selected to be equal to 378 $f_H$ and the dividing ratio of the second divider circuit 1864 is 1/126, the REF signal (horizontal synchronizing pulse) of frequency $f_H$ received at the input terminal 2 and the divided frequency $f_H$ from the second divider circuit 1864 are phase-compared to each other in the phase detector 1862, and the VCO 1861 is always phase synchronized with the REF signal. The dividing ratio of the first frequency dividing circuit 1863 is $\frac{1}{8}$. Accordingly, the output frequency of the $\frac{1}{8}$ dividing circuit 185 is $(47+\frac{1}{4})f_H$ which is obtained by $\frac{1}{8}$ dividing the output frequency $f_{VCO}$ of the VCO 1861. The signal of frequency $(47+\frac{1}{4})f_H$ is phase-inverted every line only in one side field and led to the converter 182, so that the recording low-frequency converted chrominance signal appearing at the output of LPF 162 has a frequency $f_{184}=(47+\frac{1}{4})f_H$ and becomes a signal of one-track PI system. In this case, the low-frequency converted chrominance signal has an offset of $\frac{1}{4} f_H$ and satisfies the above-mentioned condition (3).

With respect to the pilot signal, assuming that the dividing ratios $1/l_1$, $1/l_2$, $1/l_3$ and $1/l_4$ of the divider circuits 191–194 constituting the pilot signal generating circuit 190 are 1/36, 1/40, 1/50 and 1/58 respectively, the four pilot frequencies will be as follows:

| | |
|---|---|
| $l_1 = 36$ | $f_1 \approx 10.50f_H$ |
| $l_2 = 40$ | $f_2 \approx 9.45f_H$ |
| $l_3 = 50$ | $f_3 \approx 7.56f_H$ |
| $l_4 = 58$ | $f_4 \approx 6.52f_H$ |
| $f_1 - f_2 \approx f_3 - f_4 \approx f_H$ | |
| $f_1 - f_3 \approx f_3 - f_4 \approx 3f_H$ | |

In this manner, the above-mentioned conditions (1) and (2) are satisfied.

Next, description will be made with respect to the case of CCIR system. In the CCIR system, the oscillation frequency $f_{VCO}$ of the VCO 1861 is selected to be lower by $3f_H$ than that in NTSC system, namely $f_{VCO} \approx 375f_H$, and the dividing ratio of the second divider circuit 1864 is selected to be 1/125. In this case, the output frequency $f_{185}$ of the $\frac{1}{8}$ dividing circuit 185 becomes $(47-\frac{1}{8})f_H$. By phase-shifting the thus obtained signal of frequency $(47-\frac{1}{8})f_H$ by $+90°$ or $-90°$ every line, only in one side field, the recording low-frequency converted signal has a frequency $f_{162}=(47-\frac{1}{8})f_H$ and becomes a signal of one-track 90° PS system.

Accordingly, assuming now that the phase-shifting direction is $+90°$, the low-frequency converted chrominance signal in a field which has not been phase-shifted has a $-\frac{1}{8}f_H$ offset, while that in a field which has phase-shifted has a $+\frac{3}{8}f_H$ offset, with a result that the above-mentioned condition (5) is satisfied. Alternatively, if the phase shifting direction is $-90°$, the low-frequency converted chrominance signal on the side of a field which has not been phase-shifted has a $-\frac{1}{8}f_H$ offset, while that on the side of a field which has been phase-shifted has a $-\frac{5}{8}f_H$, with a result that the above-mentioned condition (5) is satisfied also in this case.

In case of CCIR system, with the same frequency dividing circuits 191–194 as those used in the previous case of NTSC system, the four pilot frequencies of the pilot signal are as follows:

| | |
|---|---|
| $l_1 = 36$ | $f_1 \approx 10.42f_H$ |
| $l_2 = 40$ | $f_2 \approx 9.38f_H$ |
| $l_3 = 50$ | $f_3 \approx 7.50f_H$ |
| $l_4 = 58$ | $f_4 \approx 6.47f_H$ |
| $f_1 - f_2 \approx f_3 - f_4 \approx f_H$ | |
| $f_1 - f_3 \approx f_2 - f_4 \approx 3f_H$ | |

Thus, the above-mentioned pilot signal conditions (1) and (2) are satisfied.

Further, in the case of CCIR system, the oscillation frequency of the VCO 1861 may be selected to be 381 $f_H$ which is different by $+3$ $f_H$ from that in the case of NTSC system and the frequency dividing ratio of the second frequency dividing circuit 1864 may be set to be 1/127. In this case, the frequency $f_{162}$ of the recording low-frequency chrominance signal is $(47+\frac{5}{8})f_H$, and has a $-\frac{1}{8}f_H$ offset on the side of field which has not been phase-shifted, while has a $+\frac{3}{8}f_H$ (or $-\frac{1}{8}f_H$) offset on the side of field which has been phase-shifted by $+90°$ and a $+\frac{3}{8}f_H$ offset if the phase-shifting is $-90°$. Thus, the above-mentioned condition (5) is satisfied also in this case.

The four pilot frequencies of the pilot signal are as follows in this case:

| | |
|---|---|
| $f_1 = 36$ | $f_1 \approx 10.58f_H$ |
| $f_2 = 40$ | $f_2 \approx 9.53f_H$ |
| $f_3 = 50$ | $f_3 \approx 7.62f_H$ |
| $f_4 = 58$ | $f_4 \approx 6.57f_H$ |
| $f_1 - f_2 \approx f_3 - f_4 \approx f_H$ | |
| $f_1 - f_3 \approx f_2 - f_4 \approx 3f_H$ | |

Thus, the conditions (1) and (2) of the pilot signal are satisfied also in this case.

Since the pilot signal generating source has been obtained in the local oscillation circuit 180 (in chrominance signal circuit) in the above-mentioned embodiment according to the present invention, it is not necessary to provide a pilot signal generating source (for example, a crystal oscillator) for exclusive use, resulting in reduction of cost. Although the pilot signal generating source is obtained in the local oscillation circuit 180 in the previous embodiment, it may be obtained another circuit in the chrominance signal circuit.

Further, if the circuit is configured in the following manner, the circuit design of the local oscillation circuit 180 and the pilot signal generating circuit 190 becomes easy in the view point of common use of these circuits for the NTSC and CCIR circuits, resulting in easiness in designing the whole of the chrominance signal circuit. That is, in the CCIR system, since the frequency of chrominance subcarrier of the low-frequency converted chrominance signal (output of the LPF 162) to be recorded onto a magnetic tape is required to have a $\frac{1}{2}f_H$ offset as discussed above, the output frequency $f_{VCO}$ of the VCO 1861 in FIG. 7 is 8 times as large as the above-mentioned chrominance subcarrier frequency and becomes to be an odd multiple of $f_H$. In order to effectively configure the divider circuits 1863 and 1864 in FIG. 7, therefore, it will do to select the output frequency $f_{VCO}$ of the VCO 1861 such that the frequency $f_{VCO}$ is exactly dividable by 3 which is the smallest element of the odd numbers. Namely, it will to select the output frequency of the VCO 1861 to be $3Nf_H$ (N being integer) and the above-mentioned chrominance subcarrier frequency to be $\frac{3}{8}Nf_H$.

Table 1 shows various examples of values of the low-frequency converted chrominance subcarrier ($\frac{3}{8}Nf_H$), the dividing ratios ($l_1$-$l_4$) for the pilot signal, pilot signal frequencies ($f_1$-$f_4$), and the relation ($f_2$-$f_1$)−($f_4$-$f_3$).

In the practical use, however, it will do to satisfy the following conditions:

$6\ 1/5f_H < f_1 < 6\ 4/5f_H,$ $7\ 1/5f_H < f_2 < 7\ 4/5f_H,$ $9\ 1/5f_H < f_3 < 9\ 4/5f_H,$ and $10\ 1/5f_H < f_4 < 10\ 4/5f_H.$ (2) $|f_1 - f_2| = |f_3 - f_4|$ To cause the value of $|f_1 - f_2|$ to be equal to that of $|f_3 - f_4|$ enables the band width of the BPFs 303 and 304 shown in FIG. 7 to be made narrow, with a result of improvement of S/N ratio of the tracking error signal. Ideally, it is preferable to satisfy the following inequal-

TABLE 1

| System | 3N | $\frac{3}{8}Nf_H$ | \multicolumn{4}{c|}{frequency dividing ratios for pilot signal} | \multicolumn{4}{c|}{pilot signal frequencies} | $(f_2 - f_1) -$ $(f_4 - f_3)$ |
|---|---|---|---|---|---|---|---|---|---|---|---|
| | | | $l_4$ | $l_3$ | $l_2$ | $l_1$ | $f_1 = \frac{3N}{l_4}f_H$ | $f_2 = \frac{3N}{l_3}f_H$ | $f_3 = \frac{3N}{l_2}f_H$ | $f_4 = \frac{3N}{l_1}f_H$ | |
| 1 | 327 | $(41 - \frac{1}{8})f_H$ | 51 | 43 | 35 | 31 | 6.412 $f_H$ | 7.605 $f_H$ | 9.343 $f_H$ | 10.548 $f_H$ | 0.012 $f_H$ |
| 2 | 330 | $(41 + \frac{1}{4})f_H$ | 52 | 44 | 35 | 31 | 6.346 $f_H$ | 7.500 $f_H$ | 9.429 $f_H$ | 10.645 $f_H$ | 0.062 $f_H$ |
| 3 | 333 | $(42 - \frac{3}{8})f_H$ | 50 | 44 | 35 | 32 | 6.660 $f_H$ | 7.568 $f_H$ | 9.514 $f_H$ | 10.406 $f_H$ | 0.016 $f_H$ |
| 4 | 336 | $42 f_H$ | 51 | 45 | 35 | 32 | 6.588 $f_H$ | 7.467 $f_H$ | 9.600 $f_H$ | 10.500 $f_H$ | 0.021 $f_H$ |
| 5 | 339 | $(42 + \frac{3}{8})f_H$ | 53 | 45 | 36 | 32 | 6.396 $f_H$ | 7.533 $f_H$ | 9.417 $f_H$ | 10.594 $f_H$ | 0.040 $f_H$ |
| 6 | 342 | $(43 - \frac{1}{4})f_H$ | 52 | 46 | 36 | 33 | 6.577 $f_H$ | 7.435 $f_H$ | 9.500 $f_H$ | 10.364 $f_H$ | 0.006 $f_H$ |
| 7 | 345 | $(43 + \frac{1}{8})f_H$ | 52 | 46 | 36 | 33 | 6.635 $f_H$ | 7.500 $f_H$ | 9.583 $f_H$ | 10.455 $f_H$ | 0.007 $f_H$ |
| 8 | 351 | $(44 - \frac{1}{8})f_H$ | 56 | 48 | 38 | 34 | 6.268 $f_H$ | 7.313 $f_H$ | 9.237 $f_H$ | 10.324 $f_H$ | 0.042 $f_H$ |
| 9 | 354 | $(44 + \frac{1}{4})f_H$ | 56 | 48 | 38 | 34 | 6.321 $f_H$ | 7.375 $f_H$ | 9.316 $f_H$ | 10.412 $f_H$ | 0.042 $f_H$ |
| 10 | 357 | $(45 - \frac{3}{8})f_H$ | 56 | 48 | 38 | 34 | 6.375 $f_H$ | 7.438 $f_H$ | 9.395 $f_H$ | 10.500 $f_H$ | 0.042 $f_H$ |
| 11 | 360 | $45 f_H$ | 55 | 47 | 38 | 34 | 6.575 $f_H$ | 7.660 $f_H$ | 9.474 $f_H$ | 10.588 $f_H$ | 0.001 $f_H$ |
| 12 | 363 | $(45 + \frac{3}{8})f_H$ | 56 | 48 | 38 | 35 | 6.482 $f_H$ | 7.563 $f_H$ | 9.553 $f_H$ | 10.371 $f_H$ | 0.264 $f_H$ |
| 13 | 366 | $(46 - \frac{1}{4})f_H$ | 56 | 48 | 38 | 35 | 6.536 $f_H$ | 7.625 $f_H$ | 9.632 $f_H$ | 10.457 $f_H$ | 0.264 $f_H$ |
| | | | | 57 | 49 | 35 | 6.421 $f_H$ | 7.469 $f_H$ | 9.385 $f_H$ | 10.457 $f_H$ | 0.024 $f_H$ |
| 14 | 369 | $(46 + \frac{1}{8})f_H$ | 57 | 49 | 39 | 35 | 6.474 $f_H$ | 7.531 $f_H$ | 9.462 $f_H$ | 10.543 $f_H$ | 0.024 $f_H$ |
| 15 | 375 | $(47 - \frac{1}{8})f_H$ | 58 | 50 | 40 | 36 | 6.466 $f_H$ | 7.500 $f_H$ | 9.375 $f_H$ | 10.417 $f_H$ | 0.008 $f_H$ |
| 16 | 378 | $(47 + \frac{1}{4})f_H$ | 58 | 50 | 40 | 36 | 6.517 $f_H$ | 7.560 $f_H$ | 9.450 $f_H$ | 10.500 $f_H$ | 0.007 $f_H$ |
| 17 | 381 | $(48 - \frac{3}{8})f_H$ | 58 | 50 | 40 | 36 | 6.569 $f_H$ | 7.620 $f_H$ | 9.525 $f_H$ | 10.583 $f_H$ | 0.007 $f_H$ |
| 18 | 384 | $48 f_H$ | 60 | 52 | 41 | 37 | 6.400 $f_H$ | 7.385 $f_H$ | 9.366 $f_H$ | 10.378 $f_H$ | 0.027 $f_H$ |
| 19 | 387 | $(48 + \frac{3}{8})f_H$ | 59 | 51 | 41 | 37 | 6.559 $f_H$ | 7.588 $f_H$ | 9.439 $f_H$ | 10.459 $f_H$ | 0.009 $f_H$ |
| 20 | 390 | $(49 - \frac{1}{4})f_H$ | 59 | 51 | 41 | 37 | 6.610 $f_H$ | 7.647 $f_H$ | 9.512 $f_H$ | 10.541 $f_H$ | 0.008 $f_H$ |
| 21 | 393 | $(49 + \frac{1}{8})f_H$ | 61 | 53 | 42 | 38 | 6.443 $f_H$ | 7.415 $f_H$ | 9.357 $f_H$ | 10.342 $f_H$ | 0.013 $f_H$ |

All the values of the low-frequency converted chrominance subcarrier can be realized in view of facilitation of the design of chrominance circuit. However, the pilot signals generated according to the Table 1 can not always be in effective in the practical use. The ideal conditions for the pilot frequencies are as follows:

(1) $\frac{1}{2}f_H$ offset

The pilot frequency is required to have a $\frac{1}{2}f_H$ offset. In the case where, for example, the system under consideration is placed in the neighborhood of a television receiver, flyback pulses may penetrate into the system so as to disturb the tracking control of the system, and therefore the $\frac{1}{2}f_H$ offset is required to avoid such disturbance. That is, since such a flyback pulse has a frequency spectrum which is an integer multiple of $f_H$, it is necessary to arrange the pilot frequencies to facilitate the discrimination of them from the flyback pulses. Accordingly, it is ideally preferable to satisfy the following conditions:

$6\frac{1}{3}f_H < f_1 < 6\frac{2}{3}f_H,$ $7\frac{1}{3}f_H < f_2 < 7\frac{2}{3}f_H,$ $9\frac{1}{3}f_H < f_3 < 9\frac{2}{3}f_H,$ and $10\frac{1}{3}f_H < f_4 < 10\frac{2}{3}f_H.$ ity:

$||f_1 - f_2| - |f_3 - f_4|| < 0.01\ f_H.$

In practical use, however, the following relation will be allowed:

$||f_1 - f_2| - |f_3 - f_4|| < 0.02 f_H$ (3) It is preferable to arrange the pilot signal benerating circuit to be easily commonly used for the NTSC system as well as the CCIR system. In particular, it means that the frequency-dividing ratios $l_1$, $l_2$, $l_3$ and $l_4$ are same between the NTSC system and the CCIR system.

(4) It is preferable to select to be even all the frequency-dividing ratios $l_1$, $l_2$, $l_3$ and $l_4$ of the pilot signal generating circuit. This makes it possible not only to simplify the frequency-dividing circuit (counter circuit) but to reduce higher harmonic distortions in the pilot signal.

(5) It is preferable to arrange the frequency value $|f_1 - f_2|$ to be approximate between the NTSC system and the CCIR system. If this condition is satisfied, there is a meritorious effect that the same BPFs 303, 304 are may be used in the NTSC system as well as in the CCIR system. In the NTSC system $f_H$=15.734 KHz, while in the CCIR system $f_H=15.625$ KHz, and therefore it is preferable to the numeral value $N_1$ in the chrominance subcarrier frequency $\frac{3}{8}N_1f_H$ in the CCIR system to be larger than that in the NTSC system in order to satisfy the condition (5). In the Table 1, the combination of the systems 16 and 17 may satisfy all the conditions (1) to (5) when they are used in the NTSC and CCIR systems respectively, and the combination of the systems 15 and 16 may satisfy the conditions (1) to (4) when they are used in the CCIR and NTSC systems respectively. The combination of the systems 13 and 14 may satisfy the conditions (2), (3) and (5) when they are used in the NTSC and CCIR systems respectively, the combination of the systems 9 and 10 may satisfy the conditions (2) to (5) when they are used in the NTSC and CCIR systems, and the combination of the systems 8 and 9 may satisfy the conditions (2) to (4) when they are used in the CCIR and NTSC systems respectively, while there is somewhat of a problem with respect to the condition (1) in each of these three conditions.

The condition (5) merely relates to a compatible apparatus for the NTSC and CCIR systems, and therefore it is not so important when compared with the other conditions (1) to (4).

Thus, the most superior ones of all the combinations of systems in the Table 1 are the combination of the systems 16 (NTSC) and 17 (CCIR) and the combination of the systems 15 (CCIR) and 16 (NTSC).

Figure 8:
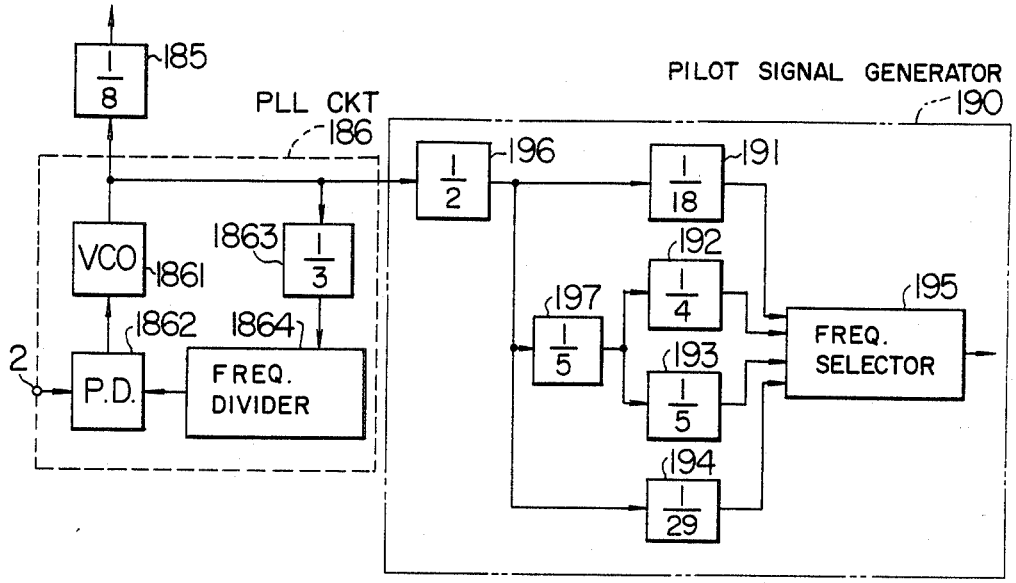
Figure 9:
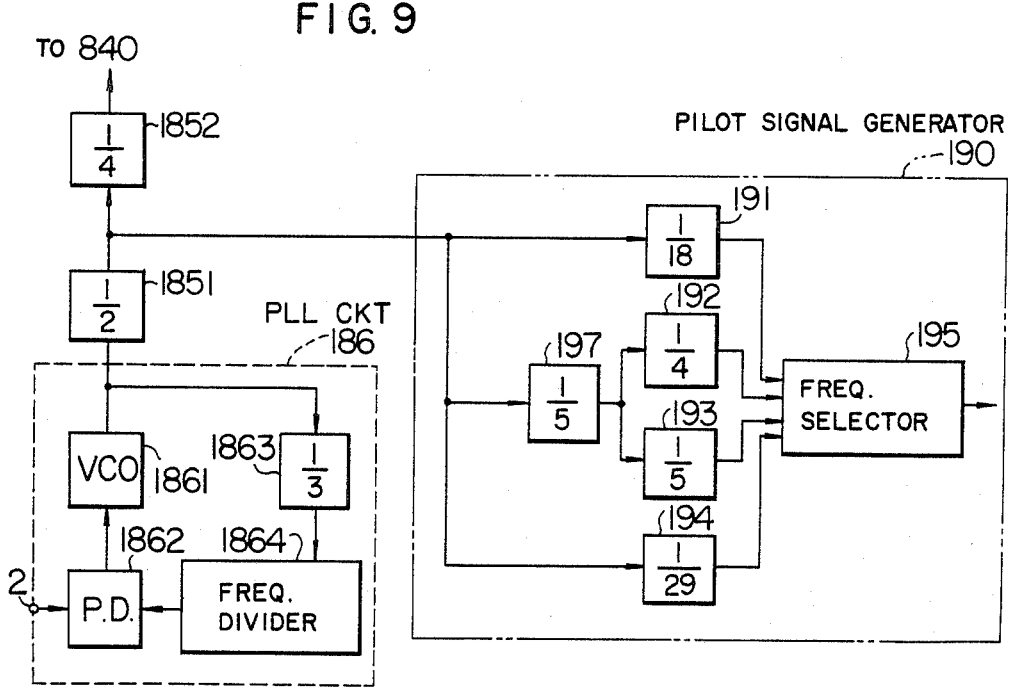

In FIGS. 8 and 9, there are shown embodiments of application of the PLL-circuit 186 and the pilot signal generating circuit 190 in the embodiment of FIG. 7. In FIG. 8, the reference numerals 191–194, 196 and 197 are frequency-dividing circuits for generating a pilot signal. A frequency-dividing circuit 1864 has its dividing ratio which is selected to be 1/126 in the NTSC system and 1/125 or 1/127 in the CCIR system. In the pilot signal generating circuit 190, the frequency-dividing circuits 191–194, 196 and 197 have their dividing ratios which are selected to be 1/18, $\frac{1}{4}$, 1/5, 1/29, $\frac{1}{2}$ and 1/5 respectively. Selecting the respective frequency-dividing ratios as above, it becomes possible to commonly use the pilot signal generating circuit in each of the NTSC and CCIR systems.

In the embodiment shown in FIG. 9, the highspeed frequency-dividing circuit 196 of FIG. 8 is eliminated. In FIG. 9, the two frequency-dividing circuits 1851 and 1852 may be obtained by dividing the $\frac{1}{8}$ frequency-dividing circuit 185 into a $\frac{1}{2}$ frequency-dividing circuit and a $\frac{1}{4}$ frequency-dividing circuit. Further, the pilot signal generating highspeed frequency-dividing circuit 196 in FIG. 8 is omitted and a highspeed $\frac{1}{2}$ frequency-dividing circuit 1851 which constitutes a $\frac{1}{8}$ frequency-dividing circuit together with a $\frac{1}{4}$ frequency-dividing circuit 1852 is commonly used also for the pilot signal generating circuit 190.

Next, referring to FIG. 8 an embodiment according to the present invention will be now described as to the case where the oscillating frequency of a VCO 1861 is changed.

In the NTSC system, assuming that oscillating frequency of the VCO 1861 is selected to be $f_{VCO}=366f_H$ and the frequency-dividing ratio of a second frequency-dividing circuit 1864 is selected to be 1/122, the output frequency of the $\frac{1}{8}$ frequency-dividing circuit 185 is $(46-\frac{1}{4})f_H$. In this case, the above-mentioned conditions (3) and (4) may be satisfied if the frequency of the recording low-frequency converted chrominance signal is $(46-\frac{1}{4})f_H$ and the one-track PI system is used. Assuming that, in this case, the frequency-dividing ratios of the frequency-dividing circuits 191 to 194 are selected to be 1/35, 1/39, 1/49, and 1/57 respectively, the four pilot frequencies will be as follows:

| | | |
|---|---|---|
| | $l_1 = 35$ | $f_1 \approx 10.46f_H$ |
| | $l_2 = 39$ | $f_2 \approx 9.38f_H$ |
| | $l_3 = 49$ | $f_3 \approx 7.47f_H$ |
| | $l_4 = 57$ | $f_4 \approx 6.42f_H$ |
| Further, | | |
| | $f_1 - f_2 \approx f_3 - f_4 \approx f_H$ | |
| | $f_1 - f_3 \approx f_2 - f_4 = 3f_H$ | |

In this manner, the conditions (1) and (2) for the pilot signal may be satisfied.

In the CCIR system, the oscillating frequency of the VCO 1861 is increased by $3f_H$ in comparison with the case of the NTSC system to be $f_{VCO}=369f_H$ and the frequency-dividing ratio of the second frequency-dividing circuit 1861 is selected to be 1/123. In this case, the above-mentioned conditions (5) and (6) may be satisfied if the frequency of the recording low-frequency converted chrominance signal is $(46+\frac{1}{4})f_H$ and the one-track 90 degrees PS system is used.

Assuming that, in this case, the frequency-dividing ratios of the frequency-dividing circuits 191 to 194 are the same as those of the NTSC system, the four pilot frequencies will be as follows:

| | |
|---|---|
| $l_1 = 35$ | $f_1 \approx 10.46f_H$ |
| $l_2 = 39$ | $f_2 \approx 9.38f_H$ |
| $l_3 = 49$ | $f_3 \approx 7.47f_H$ |
| $l_4 = 57$ | $f_4 \approx 6.42f_H$ |

Accordingly, the conditions (1) and (2) for the pilot signal may be satisfied.

Figure 10:
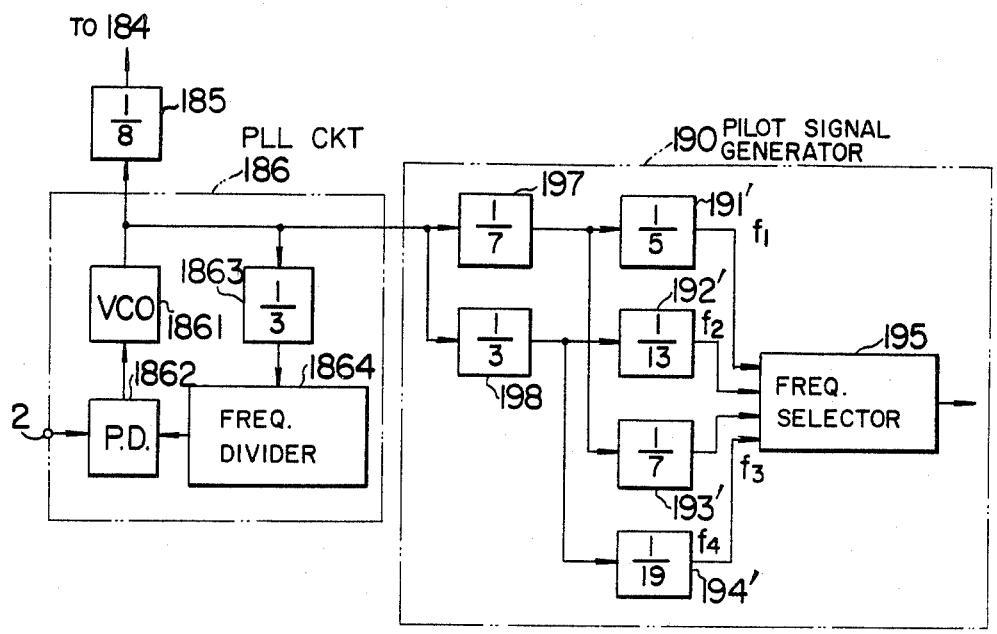

In FIG. 10, there is shown an example of the configuration constituted by a PLL circuit 186, a pilot signal generating circuit 190 and a $\frac{1}{8}$ frequency-dividing circuit 185, which is suitable for the above-mentioned embodiment. In FIG. 10, a second dividing circuit 1864 is selected to have its dividing ratio 1/122 in the NTSC system and 1/123 in the CCIR system. In the pilot signal generating circuit 190, the frequency-dividing circuits 191'–194', 197 and 198 have their dividing ratios which are selected to be 1/5, 1/13, 1/7, 1/19, 1/7, $\frac{1}{3}$ respectively regardless of the kind of system, whether it is the NTSC system or the CCIR system.

Figure 11:
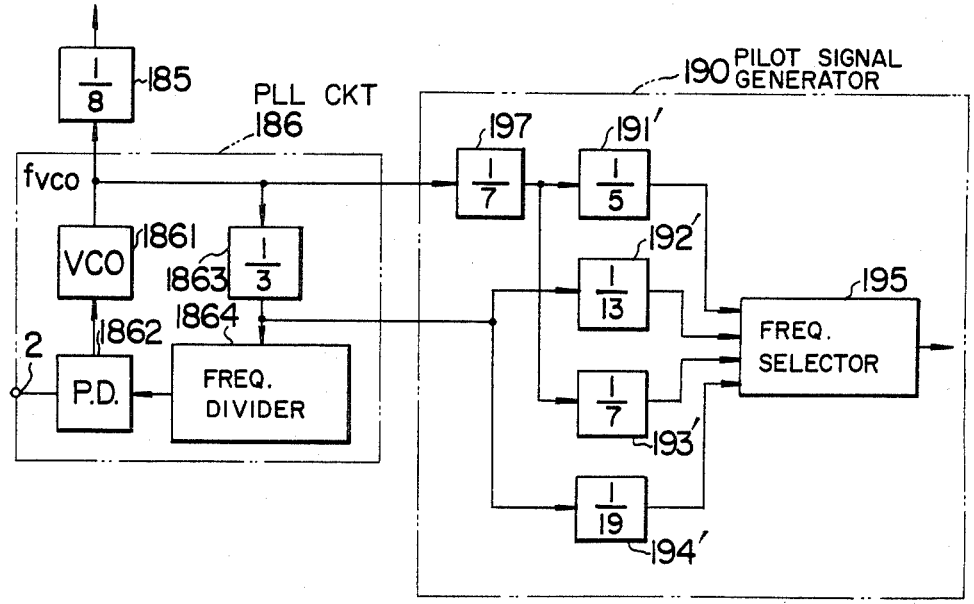

In FIG. 11, the highspeed frequency-dividing circuit 198 of FIG. 10 is eliminated so that the first frequency-dividing circuit 1863 is commonly used also for the pilot signal generating circuit, resulting in simplification of the circuit.

Next, referring to FIG. 7, an embodiment according to the present invention will be described in which the oscillating frequency of the VCO 1861 in the NTSC system is the same as that in the above-mentioned embodiment, while the frequency-dividing ratio of the frequency-dividing circuit for generating the pilot signal is different therefrom.

In the NTSC system, assuming that the oscillating frequency of the VCO 1861 is selected to be $f_{VCO}=366f_H$ and the frequency-dividing ratio of the second frequency-dividing circuit 1864 is selected to be 1/122, the frequency of the low-frequency converted chrominance signal is $(46-\frac{1}{4})f_H$, and the above-mentioned conditions 3 and 4 may be satisfied if the one-track PI system is used.

Assuming that, in this case, the frequency-dividing ratios of the frequency-dividing circuits 191 to 194 are selected to be 1/35, 1/38, 1/48, and 1/56 respectively, the four pilot frequencies will be as follows:

| | |
|---|---|
| $l_1 = 35$ | $f_1 \approx 10.46f_H$ |
| $l_2 = 38$ | $f_2 \approx 9.63f_H$ |
| $l_3 = 48$ | $f_3 \approx 7.63f_H$ |
| $l_4 = 56$ | $f_4 \approx 6.54f_H$ |

In this manner, the conditions (1) and (2) for the pilot signal may be satisfied.

In the CCIR system, if the oscillating frequency of the VCO 1861 is decreased by $3f_H$ in comparison with the case of the NTSC system to be $f_{VCO}=363f_H$ and the frequency-dividing ratio of the second frequency-dividing circuit 1864 is selected to be 1/121, the frequency of the recording low-frequency converted chrominance signal is $(45+\frac{3}{8})f_H$, and the above-mentioned conditions (5) and (6) may be satisfied when the one-track 90 degrees PS system is used.

Assuming that, in this case, the frequency-dividing ratios of the frequency-dividing circuits 191 to 194 are the same as those of the NTSC system, the four pilot frequencies will be as follows:

| | |
|---|---|
| $l_1 = 35$ | $f_1 \approx 10.37f_H$ |
| $l_2 = 38$ | $f_2 \approx 9.55f_H$ |
| $l_3 = 48$ | $f_3 \approx 7.56f_H$ |
| $l_4 = 56$ | $f_4 \approx 6.48f_H$ |

Thus, the above-mentioned conditions (1) and (2) for the pilot signal may be satisfied.

Figure 12:
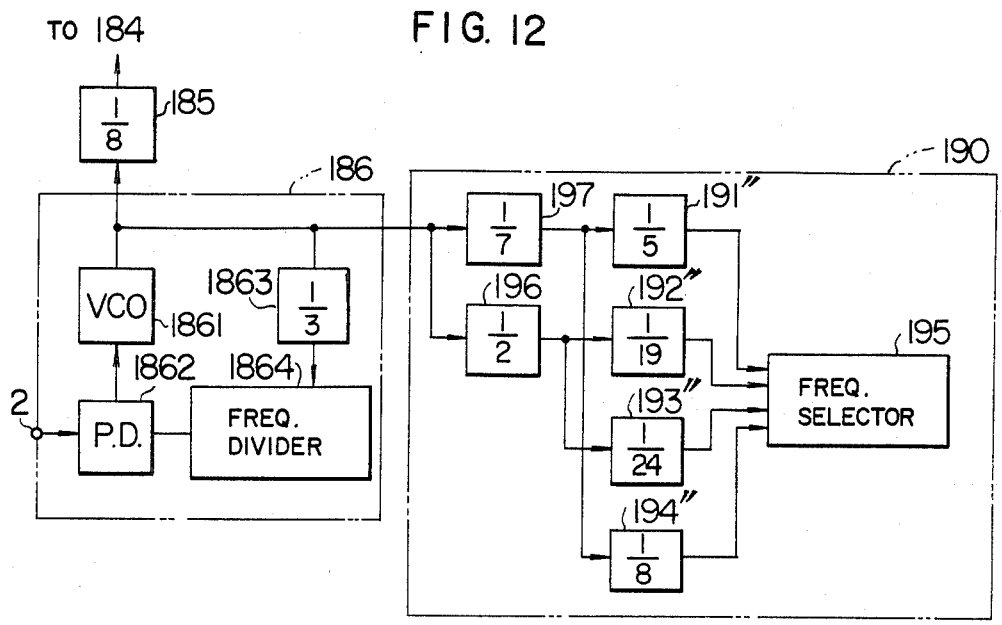

In FIG. 12, there is shown an example of the configuration constituted by a PLL circuit 186, a pilot signal generating circuit 190 and a $\frac{1}{8}$ frequency-dividing circuit 185, which is suitable for thea above-mentioned embodiment. In FIG. 12, a second dividing circuit 1864 is selected to have its dividing ratio 1/122 in the NTSC system and 1/121 in the CCIR system. In the pilot signal generating circuit 190, the frequency-dividing circuits 191″-194″, 197 and 196 have their dividing ratios which are selected to be 1/5, 1/19, 1/24, $\frac{1}{2}$, 1/7, $\frac{1}{2}$ respectively regardless of the kind of system, whether it is the NTSC system or the CCIR system.

Figure 13:
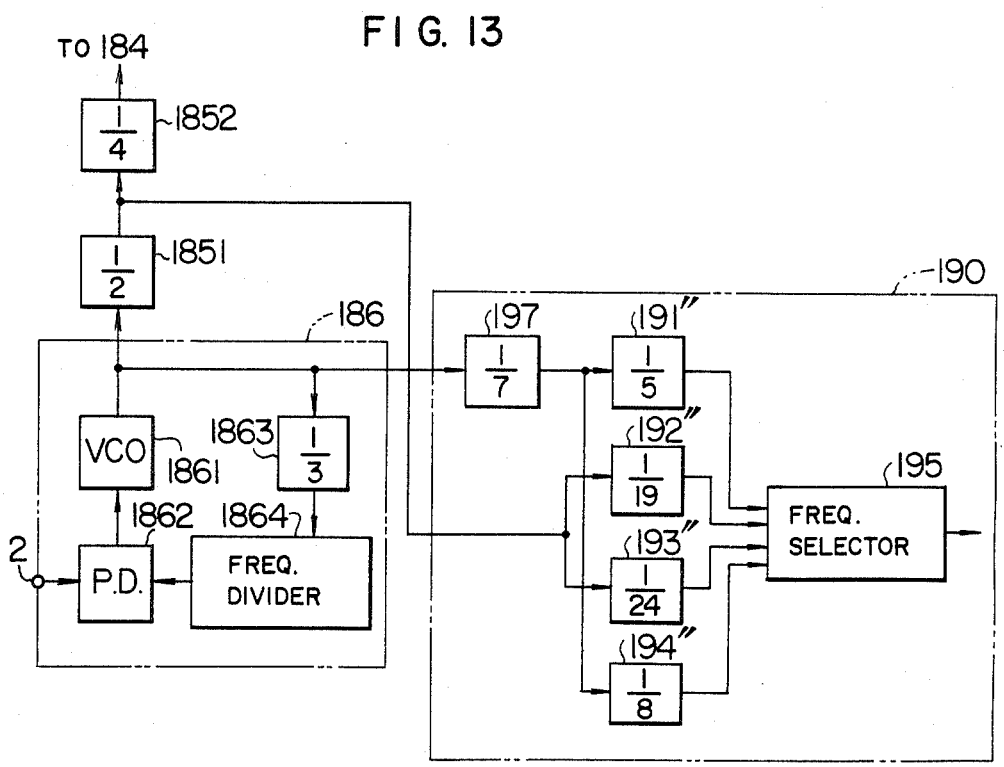

In FIG. 13, the highspeed frequency-dividing circuit 196 of FIG. 12 is eliminated so that the $\frac{1}{2}$ frequency-dividing circuit 1851, which constitutes the $\frac{1}{8}$ frequency-dividing circuit together with the $\frac{1}{4}$ frequency-dividing circuit 1852, is commonly used also for the pilot signal generating circuit, resulting in simplification of the highspeed frequency-dividing circuit 197.

Next, referring to FIG. 7, another embodiment according to the present invention will be described in which the oscillating frequency of the VCO 1861 is different.

In the NTSC system, assuming that the oscillating frequency of the VCO 1861 is selected to be $f_{VCO}=354f_H$ and the frequency-dividing ratio of the second frequency-dividing circuit 1864 is selected to be 1/118, the frequency of the low-frequency converted chrominance signal is $(44+\frac{1}{8})f_H$, and the above-mentioned condition (3) may be satisfied if the one-track PI system is used.

Assuming that, in this case, the frequency-dividing ratios of the frequency-dividing circuits 191 to 194 are selected to be 1/34, 1/38, 1/48, and 1/56 respectively, the four pilot frequencies will be as follows:

| | |
|---|---|
| $l_1 = 34$ | $f_1 \approx 10.41f_H$ |
| $l_2 = 38$ | $f_2 \approx 9.32f_H$ |
| $l_3 = 48$ | $f_3 \approx 7.38f_H$ |
| $l_4 = 56$ | $f_4 \approx 6.32f_H$ |

In this mannner, the above-mentioned conditions (1) and (2) for the pilot signal may be satisfied.

In the CCIR system, if the oscillating frequency of the VCO 1861 is decreased by $3f_H$ in comparison with the case of the NTSC system to be $f_{VCO}=351f_H$ and the frequency-dividing ratio of the second frequency-dividing circuit 1864 is selected to be 1/117, the frequency of the recording low-frequency converted chrominance signal is $(44-\frac{5}{8})f_H$, and the above-mentioned condition (5) may be satisfied when the one-track 90 degrees PS system is used.

Assuming that, in this case, the frequency-dividing ratios of the frequency-dividing circuits 191 to 194 are the same as those of the NTSC system, the four pilot frequencies will be as follows:

| | |
|---|---|
| $l_1 = 34$ | $f_1 \approx 10.33f_H$ |
| $l_2 = 38$ | $f_2 \approx 9.24f_H$ |
| $l_3 = 48$ | $f_3 \approx 7.31f_H$ |
| $l_4 = 56$ | $f_4 \approx 6.27f_H$ |

Thus, the above-mentioned conditions (1) and (2) for the pilot signal may be satisfied.

In the CCIR system, if the oscillating frequency of the VCO 1861 is increased by $3f_H$ in comparison with the case of the NTSC system to be $f_{VCO}=357f_H$ and the frequency-dividing ratio of the second frequency-dividing circuit 1864 is selected to by 1/119, the frequency of the recording low-frequency converted chrominance signal is $(44+\frac{3}{8})f_H$, and the above-mentioned conditions (5) and (6) may be satisfied when the one-track 90 degrees PS system is used.

Assuming that, in this case, the frequency-dividing ratios of the frequency-dividing circuits 191 to 194 are the same as those of the NTSC system, the four pilot frequencies will be as follows:

| | |
|---|---|
| $l_1 = 34$ | $f_1 \approx 10.50f_H$ |
| $l_2 = 38$ | $f_2 \approx 9.39f_H$ |
| $l_3 = 48$ | $f_3 \approx 7.43f_H$ |
| $l_4 = 56$ | $f_4 \approx 6.38f_H$ |

Thus, the above-mentioned conditions (1) and (2) for the pilot signal may be satisfied.

Figure 14:
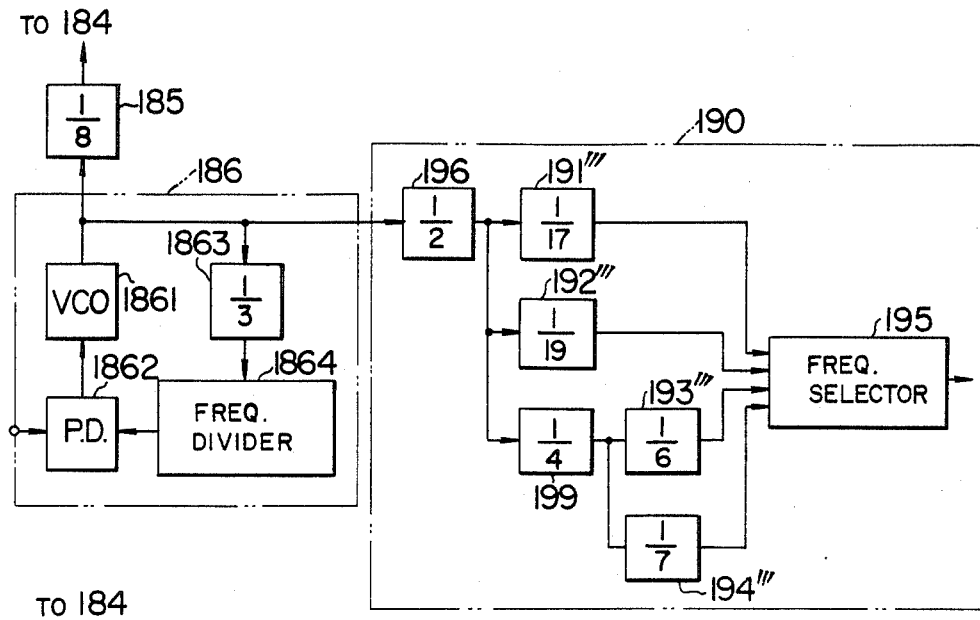

In FIG. 14, there is shown an example of the circuit configuration which is constituted by a PLL circuit 186, a pilot signal generating circuit 190 and a $\frac{1}{8}$ frequency-dividing circuit 185, and which is suitable for the above-mentioned embodiment. In FIG. 14, a second dividing circuit 1864 is selected to have its dividing ratio 1/118 in the NTSC system and 1/117 or 1/119 in the CCIR system. In the pilot signal generating circuit 190, the frequency-dividing circuits 191‴-194‴, 196 and 199 have their dividing ratios which are selected to be 1/17, 1/19, 1/6, 1/7, $\frac{1}{2}$, $\frac{1}{4}$ respectively regardless of the kind of system, whether it is the NTSC system or the CCIR system.

Figure 15:
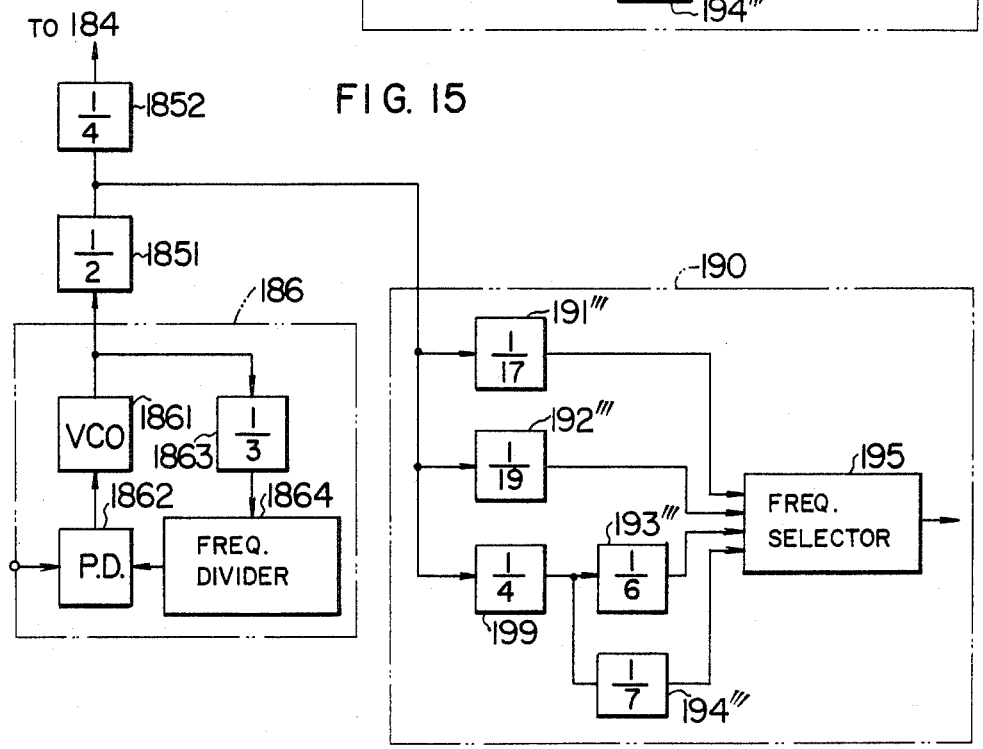

In FIG. 15, the highspeed frequency-dividing circuit 196 of FIG. 14 is eliminated so that the $\frac{1}{2}$ frequency-dividing circuit 1851, which constitutes the $\frac{1}{8}$ frequency-dividing circuit 185 together with the $\frac{1}{4}$ frequency-dividing circuit 1852, is commonly used also for the pilot signal generating circuit, resulting in simplification of the highspeed frequency-dividing circuit.

Figure 16:
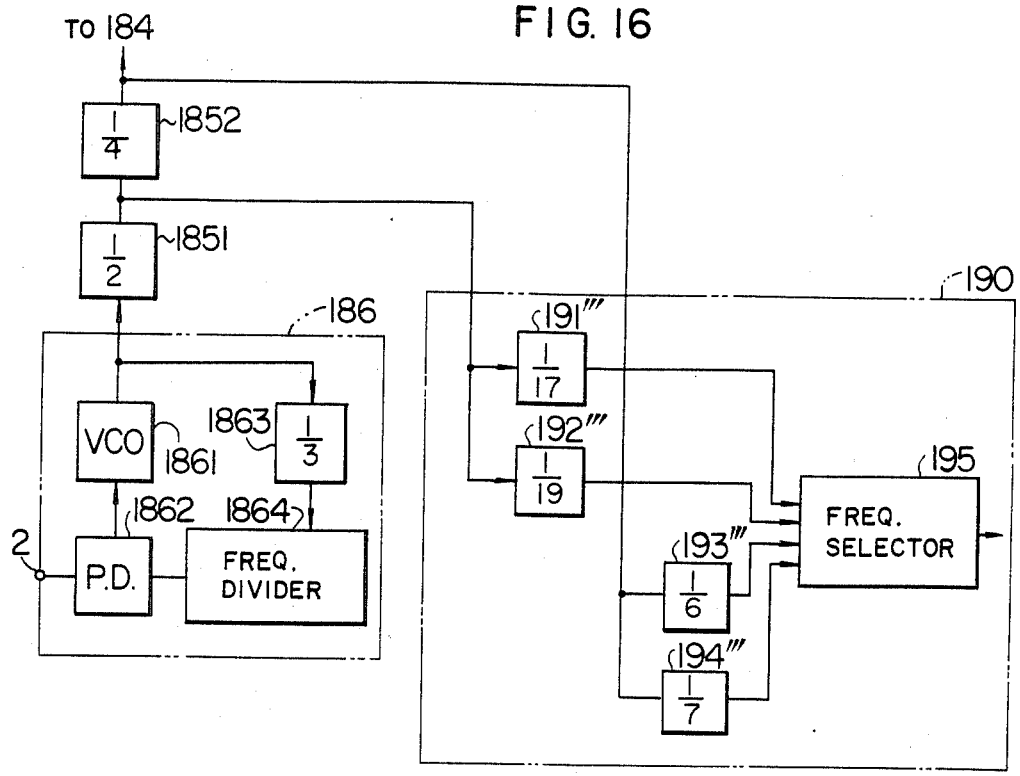

In FIG. 16, the highspeed frequency-dividing circuit 199 of FIG. 15 is eliminated so that the $\frac{1}{4}$ frequency-dividing circuit 1852, which constitutes the $\frac{1}{8}$ frequency-dividing circuit together with the $\frac{1}{2}$ frequency-dividing circuit 1851, is commonly used also for the pilot signal generating circuit, resulting in simplification of the frequency-dividing circuit.

Various embodiments have been described above in the case where the one-side field PI system is employed as a method to satisfy the above-mentioned condition (4) for the low-frequency converted chrominance signal in the NTSC system.

Next, an embodiment employing the above-mentioned both fields PS system in the NTSC system will be described.

FIG. 17 is a block diagram illustrating the embodiment which is featured in that the output signal of a $\frac{1}{8}$ frequency-dividing circuit has its frequency of $Mf_H$ or $(M+\frac{1}{2})f_H$ (M being integer). In this case, the both fields PS system is employed and by a phase shifting circuit 184 one of the fields is phase-shifted by +90 degrees every line while the other field is phase-shifted by −90 degrees every line, so that the low-frequency converted chrominance signals of the both field respectively have offsets of $+f_H/4$ and $-f_H/4$ and the both fields have an offset of $f_H/2$ therebetween, thereby the above-mentioned conditions (3) and (4) can be satisfied.

Further, if the frequency of the $\frac{1}{8}$ frequency-dividing circuit is $45f_H$, the oscillating frequency $f_{VCO}$ of the VCO 1861 will be $45f_H \times 8 = 360f_H$. In this case, for example, if the frequency-dividing ratio of the first frequency-dividing circuit 1865 is $\frac{1}{2}$, it will do to set the frequency-dividing ratio of the second frequency-dividing circuit 1866 to be $2/360 = 1/180$.

As seen from the foregoing description, the conditions for the pilot signal will be as follows:

$$f_2 - f_1 \approx f_4 - f_3 \approx f_H$$

$$f_3 - f_1 = f_4 - f_2 \approx 3f_H$$

In FIG. 17, accordingly, it will do to select the frequency-dividing ratios $1/l_1$, $1/l_2$, $1/l_3$, $1/l_4$ of the frequency-dividing circuits 191–194 constituting the pilot signal generating circuit 190 to be as follows:

| | |
|---|---|
| $l_1 = 28$ | $f_1 \approx 6.43f_H$ |
| $l_2 = 24$ | $f_2 \approx 7.50f_H$ |
| $l_3 = 19$ | $f_3 \approx 9.47f_H$ |
| $l_4 = 17$ | $f_4 \approx 10.59f_H$ |
| $f_2 - f_1 = 1.07f_H$, | $f_4 - f_3 = 1.12f_H$ |
| $f_3 - f_1 = 3.04f_H$, | $f_4 - f_2 = 3.09f_H$ |

Accordingly, the conditions for the pilot signal can be satisfied.

In these embodiments, no expensive Xtal element is required to generate a pilot signal, the chip areas can be largely reduced when the circuit is configured by ICs and the power consumption can be decreased. Especially, since the frequency of the pilot signal is exactly a multiple of the frequency of the horizontal synchronizing frequency, the system is superior in interchangeability of tape, resulting in improvement in its performance in comparison with the conventional technique.

FIG. 18 shows an embodiment in which an oscillator is commonly used for generating a pilot signal as well as for generating an oscillating frequency $Nf_H$ (N being integer) to produce a carrier used for the low-frequency conversion of chrominance signal, and a highspeed logic element used in the frequency-dividing circuit for generating a pilot signal is eliminated by selecting the frequency of the pilot signal to be $(N/2l)f_H$ (l being integer), so as to reduce the chip areas as well as the power consumption.

In FIG. 18, the embodiment is different from the FIG. 7 embodiment in that the phase-shifting circuit 184 is eliminated and the $\frac{1}{8}$ frequency-dividing circuit 185 is directly connected to the converter 182, and that the frequency-dividing ratio of the frequency-dividing circuit 1864' is switched between $1/N_1$ and $1/N_2$.

An embodiment according to the present invention in the NTSC system in which phase-shifting is not effected will be described hereunder. It is necessary to cause the output frequency of the $\frac{1}{8}$ frequency-dividing circuit 185 is different from each other for both the fields, and therefore it is selected, for example, to be $(48-\frac{1}{4})f_H$ and $(48+\frac{1}{4})f_H$. This is to provide a chrominance signal frequency difference $\frac{1}{2}f_H$ and a frequency offset $\frac{1}{4}f_H$ between fields. Further, if the output frequency of the $\frac{1}{8}$ frequency-dividing circuit 185 is $(48-\frac{1}{4})f_H$ in the first field, the oscillating frequency $f_{VCO}$ of the VCO 1861 has to be $8 \times (48-\frac{1}{4})f_H = 382f_H$, while if it is $(48+\frac{1}{4})f_H$, the oscillating frequency $f_{VCO}$ of the VCO 1861 has to be $8 \times (48+\frac{1}{4})f_H = 386f_H$. Accordingly, it will do to select the frequency-dividing ratio of the frequency-dividing circuit 1864' to be 1/382 in the first field and 1/386 in the second field.

In this case, the frequency-dividing ratios $1/l_1$, $1/l_2$, $1/l_3$, $1/l_4$ of the frequency-dividing circuits 191–194 constituting the pilot signal generating circuit 190 are selected to be as follows:

| | |
|---|---|
| $l_1 = 29$ | $f_1 = \dfrac{382f_H}{2 \times 29} = 6.59f_H$ |
| $l_2 = 26$ | $f_2 = \dfrac{386f_H}{2 \times 26} = 7.42f_H$ |
| $l_3 = 20$ | $f_3 = \dfrac{386f_H}{2 \times 20} = 9.65f_H$ |
| $l_4 = 18$ | $f_4 = \dfrac{382f_H}{2 \times 18} = 10.61f_H$ |
| $f_2 - f_1 = 0.83f_H$, | $f_4 - f_3 = 0.96f_H$ |
| $f_3 - f_1 = 3.06f_H$, | $f_4 - f_2 = 3.19f_H$ |
| $\alpha_1 = 0.59$, $\alpha_2 = $ , | $\alpha_3 = 0.65$, $\alpha_4 = 0.61$ |

Accordingly, the above-mentioned conditions (1), (2) and (3) for the pilot signal can be satisifed.

In this embodiment, since no expensive Xtal element is required to generate a pilot signal and the frequency of the pilot signal can be selected to be exactly a multiple of the horizontal scanning frequency, the system is superior in interchangeability of tape, resulting in improvement in its performance in comparison with the conventional technique. Further, since the input frequency of the pilot signal generating frequency-dividing circuit is about $193f_H \approx 3MHz$ and therefore the frequency-dividing circuit may be composed by low-frequency logic elements, for example by integrated injection logics (I²L), the chip areas as well as the power consumption may be reduced when the system is realized by ICs.

A method of generating a pilot signal in the recording operation has been described above with respect to the chrominance signal low-frequency converting circuit. It is apparent, however, that this method is not limited to such a chrominance signal low-frequency coversion system but it may be applied to other signalling system.

A method of reproducing a pilot signal recording pattern according to the four-frequency pilot system shown in FIGS. 1A and 1B will be described hereunder.

In reproducing operation, the first and second heads reproduce not only the pilot signal on the main track but the pilot signal on the adjacent track as a cross-talk component. For example, in FIG. 1A, when the first head is scanning a track $A_3$ to reproduce a pilot signal frequency $f_1$, it reproduces, at the same time, pilot signal frequencies $f_3$, $f_2$ on the adjacent tracks $B_2$, $B_3$. In order to obtain a tracking error signal, a difference in reproducing level between these pilot signal frequencies $f_3$ and $f_2$ is detected and the difference therebetween is produced as the tracking error signal. For example, when the track $A_3$ is scanned in FIG. 1A, the level of the pilot signal frequency $f_3$ is subtracted from that of the pilot signal frequency $f_2$ so as to produce the difference as the tracking error signal. In response to the tracking error signal, the head is controlled by a servomechanism so as to make the tracking error to be zero in such a manner that when the tracking error signal has a positive value, this means that the head is shifted rightward with respect to the track $A_3$ and therefore it is moved left, and vice versa. As will be apparent when comparison is made between FIGS. 1A and 1B, the respective order of arrangements of the pilot signal frequencies on adjacent tracks are reversed to each other in FIGS. 1A and 1B. This is due to the mirror symmetrical arrangement of the pilot signals in FIGS. 1A and 1B. As a result, the polarity of the tracking error signal with respect to a track shift is opposite to each other between FIGS. 1A and 1B. FIG. 19 illustrates variations in level of tracking error signal with respect to variations in amount of track shift. FIG. 19 shows the relation between the amounts of track shift and tracking error with respect to those in the standard status in which the first head traces along the center of the track $A_1$. As seen in FIG. 19, in the operation with the second recording-time mode (LP-mode), it will do to reverse the polarity of the tracking error signal to be supplied to the servo-circuit (not shown) with respect to the first recording-time mode (SP-mode) in order to effect correct tracing. The respective pilot signals from the two adjacnet, left and right, tracks are distinguished by the frequency difference therebetween. In a practical case, the reproducing pilot signal frequency component from adjacent track is frequency-converted with the pilot signal frequency of the main track and extracted as a signal having a frequency which indicates the difference value between the respective frequencies of the pilot signals on the main and adjacent tracks. For example, in FIG. 1A, when the track $A_3$ is traced, the frequency difference is $f_H$ on the right adjacent track and $3f_H$ on the left adjacent track. However, if $f_1$ is used as a frequency for frequency conversion on the track $A_4$, the frequency difference is $3f_H$ on the right adjacent track and $f_H$ on the left adjacent track, so that the polarity of the tracking error signal is opposite to each other.

As a result, if the frequency for frequency conversion is fixed to $f_1$, the relation between the track shift and the tracking error amount are as shown in FIG. 19. Now, if the frequency for frequency conversion is changed from $f_1$ to $f_4$, the polarity of the tracking error is reversed. This relation applies to the frequencies $f_2$ and $f_3$, and if the frequency for frequency conversion is changed from $f_2$ to $f_3$, the polarity of the tracking error is reversed. When recording has been effected in the SP-mode as shown in FIG. 1A or in the LP-mode as shown in FIG. 1B, it is required in order to correctly trace in the reproducing operation that the pilot signal frequencies for frequency conversion are circulated in the same order or rotation as that in the recording operation. Accordingly, in the example of SP-mode as shown in FIG. 1A, the frequencies are circulated in the order of $f_1$, $f_2$, $f_4$, $f_3$ . . . , while in the example of LP-mode as shown in FIG. 1B, they are circulated in the order of $f_1$, $f_3$, $f_4$, $f_2$ , . . . . Generally, when the tape speed is different between the recording and reproducing operations, the amount of track shift, which is assumed to be zero when the tracing is correctly effected, increases or decreases with a predetermined rate. Accordingly, since the tracking error shows a correct value in the case where the rotation of the frequencies for frequency conversion in the reproducing operation is the same as that in the recording operation, the amount of track shift varies continuously and discontinuity does not occur even during the switching operation of head. However, if the recording mode varies on the way of reproducing operation, or if the signal has been recorded on the tape in the recording mode which is different from that is expected, the rotation in the reproducing operation differs from that in the recording operation. In the examples as shown in FIGS. 1A and 1B, since the rotation is $f_1$, $f_2$, $f_4$, $f_3$, . . . in the former and $f_1$, $f_3$, $f_4$, $f_2$, . . . in the latter, the frequencies $f_2$ and $f_3$ are replaced in the respective rotations. Accordingly, in the example shown in FIGS. 1A and 1B, if the rotation does not agree, the tracking error will show an opposite polarity to its correct value and discontinuity of tracking error will occur at the time of head switching. FIG. 20 shows examples of variations in tracking error in the reproducing operation when the recording mode changes from the SP-mode to LP-mode and from LP-mode to SP-mode respectively.

As shown in FIG. 20, since the polarity of the tracking error is reversed, the value of tracking error crosses the zero level. Using this zero crossing, it becomes possible to judge the recording mode.

An embodiment of the recording-mode judging circuit in a four-frequency pilot system will be described hereunder.

FIG. 21 is a block diagram showing an embodiment of the recording-time judging circuit in the four-frequency pilot system. Only a pilot signal is extracted from a reproduced signal applied to an input terminal 1″ from a first or a second head through a low-pass filter 301. This pilot signal is applied to a frequency-converting circuit 302. When the head correctly traces a recording track on a tape, the pilot frequencies of the track which is not being traced are used for the signal frequencies ($f_1$–$f_4$) for frequency conversion, and the pilot signal frequency components of adjacent tracks which are reproduced as cross-talk components from the adjacent tracks are frequency-converted as components having frequencies showing the differences in pilot signal frequencies between the main track and adjacent tracks. The difference-frequencies are $f_H$ and $3f_H$. Accordingly, the level difference of the reproduced signals having these frequencies $f_H$ and $3f_H$ indicates the shift of track. In FIG. 21, the output of the frequency converting circuit 302 is applied to band-pass filters 303 and 304 respectively having central frequencies $f_H$ and $3f_H$ and the reproducing pilot signals from the adjacent tracks are separated thereat. The reproduced levels of the respective separated pilot signals are detected by envelope detecting circuits 305 and 306 and applied to a subtracting circuit 307 which produces in turn a signal showing the level difference between the two levels. Since it is necessary to change over the polarity of this level-difference signal depending on the fact which head is now being used, the first one or the second one, the polarity of the level-difference signal is reversed in a polarity reversing circuit 308 in response to a head changing-over signal so as to produce a tracking error signal. This tracking error signal is shaped by a waveform shaping circuit 401. FIG. 22 shows signal waveforms at various portions of the circuit of FIG. 21. When the reproducing-time mode for reproducing a signal recorded on a tape is different from the recording-time mode in which the signal has been recorded on the tape, the tracking error signal has been already shown in FIG. 20, and the same waveform of this tracking error signal is shown in FIG. 22(b). The output of the waveform shaping 401 circuit has a waveform as shown in FIG. 22(c) and applied to a mono-stable multivibrator 402 which is actuated at both the rising and falling of the applied signal and produces in turn a pulse train as shown in FIG. 22(d). Another mono-stable multivibrator 403 receives the headchange-over signal and produces a pulse as shown in FIG. 22(e) every time the head is changed over. The output of the mono-stable multivibrator 402 is applied to one of the two inputs of an AND gate 405 through a gate 405 which will be described later and the output of the mono-stable multivibrator 403 is applied to the other input of the AND gate 405, so that the AND gate 405 produces a pulse train as shown in FIG. 22(f). If the frequency rotation of the four-frequency pilot signal in the recording operation is the same as that of the pilot signal for frequency conversion in the reproducing operation, such discontinuity does not occur. Even if discontinuity occurs at the time of head change-over due to a head offset or a curve of recording track, the value of this discontinuity is usually very small and the zero-crossing seldom occurs. Considering the zero-crossing of the tracking error level which may seldom occur due to such a head offset or curve of track, it will do to count the number of pulses produced by the AND gate 405 for a predetermined period of time so that when the count exceeds a predetermind value, the recording-time is change-over. To this end, a counter 406 receives the head change-over signal and produces a pulse having a predetermined pulse-width as shown in FIG. 22(g). This pulse is applied to an AND gate 407 so that the AND gate 407 allows the pulses produced by the AND gate 405 to pass therethrough to a counter 408 for the time of the pulse-width of the output of the counter 406. The counter 408 is reset by the rising of the output pulse of the counter 406 and counts the input pulses from the AND gate 407 so as to produce a pulse only when the count exceeds a predetermined value. The output of the counter 408 is applied to a flip-flop 409 so as to change the output level of the flip-flop 409 from high to low or from low to high. When the reproducing operation is started from the sttopage status, the output of the flip-flop 409 is reset by a reset signal and initial-set at a certain recording-time mode. Thereafter, if this initial setting is correct, the counter 408 does not produce any pulse so as to provide the correct mode judgement. If the initial setting is not correct or the mode changes on the way of reproducing operation, the counter 408 produces a pulse so as to change the output of the flip-flop 409 to indicate the correct recording-time mode.

The tracking error signal is applied also to a full-wave rectifying circuit 410 and full-wave rectified thereat. The output of the full-wave rectifying circuit 410 is applied to a waveform shaping circuit 411 and caused to be a high level when it is higher than a threshold level and a low level when it is lower than the threshold level. FIG. 22(h) and FIG. 22(i) show the outputs of the full-wave rectifying circuit 410 and the waveform shaping circuit 411 respectively. The output of the waveform shaping circuit 411 is applied to the AND gate 404. The purpose of the AND gate 404 is to intercept the output pulse of the mono-stable multivibrator 402 so as to prevent such a mal-operation as to mistake the judgement of recording-time mode from occurring when the tracing is made correctly. To this end, alternatively, quite the same effect may be expected by shifting the value of the tracking error applied to the wave shaping circuit 401 by a slight dc value in place of the circuits 410, 411 and 404. In the above-described embodiment, although it is possible to judge the recording-time mode in the case of ordinary reproducing operation or variable speed reproducing operation, there is a special case in which the change-over of head always occurs at the zero position of the tracking error in a search reproducing operation with a fixed tape speed and with a phase-locked tape running. In this case, it is impossible to detect the change in recording-time mode by the above-mentioned means. In such a special case, however, the recording-time mode may be easily detected by other simple means and, therefore, in a system provided with such a search speed, it will do to provide also such other means. It is limited to the case of search reproducing operation that such a special condition occurs. Since a head crosses several recording tracks in one field period, the difference in recording-time mode corresponds to the difference in number of tracks which are crossed by the head and therefore it will do to detect the number of the tracks. This is attained by counting the number of times of the zero-crossing of the tracking error in one field period.

In the embodiment described above, the recording-time mode can be automatically surely attained with a simple circuit configuration at any tape-reproducing speed so that a magnetic reproducing system may be provided with is inexpensive and which has various kinds of recording-time modes.

FIG. 23 is a block diagram showing another embodiment of the recording-time mode judging circuit in the four-frequency pilot system. In FIG. 23, the same parts as those in FIG. 21 are applied with the same reference numerals and the explanation thereof is omitted.

Generally, a large extent of mistracking may occur when the reproducing operation is started from the sttopage status or when the recording-time mode in which the signal has been recorded changes on the way of reproducing operation so that a track next but one to the correct track may be traced. In this case, a pilot signal frequency difference $4f_H$ is generated in the first head and $2f_H$ in the second head. Accordingly, by detecting the frequency difference, it is possible to judge the fact that the next but one track is being traced. This will be described by referring to FIG. 23. The output of a frequency converting circuit 302 is applied to band-pass filters 421 and 422 having central frequencies $2f_H$ and $4f_H$ respectively so that the pilot frequencies of the next but one tracks are extracted. The levels of the separated and extracted pilot signals are detected in the envelope detecting circuits 423 and 424 and shaped in the waveform shaping circuit 425 and 426, respectively. When the waveform shaping circuit 425 or 426 detects the $2f_H$ or $4f_H$ signal having a level equal to or larger than a predetermined value respectively, it produces a high level signal as its output. The outputs of the waveform shaping circuits 425, 426 are applied to an OR circuit 427 which produces a high level signal when the head traces the next but one tracks.

The tracking error signal is applied also to a polarity controlling circuit 428. A relative speed judging circuit 429 serves to judge the relative speed and direction between the recording track and the head by the tape speed at the recording operation and the actual tape speed at the reproducing operation based on the actual operating mode signal, at the reproducing operation, either the SP reproducing or the LP reproducing. The polarity of the tracking error signal is changed over in response to the output of the circuit 429. In FIG. 19, the point B indicates a status that the first head (FIG. 19a) or the second head (FIG. 19b) traces the center of the next but one track, in which status the direction of change of the tracking error is opposit to that at the point A indicating the status in which the head traces the center of the main track. However, the SP-mode is opposite to the LP-mode in direction of change of the tracking error and therefore by using this fact the mode judgement can be attained. Further, as described above, by producing a correct signal from the relative speed judging circuit 429, the axis of abscissa can be considered as a time axis. As seen in FIG. 23, therefore, the output of the polarity controlling circuit 428 is shaped in a waveform shaping circuit 430 and the output of the waveform shaping circuit 430 is applied to mono-stable multivibrator 431 and 432 each of which is actuated by the rising and the falling of the output of the waveform shaping circuit 430 so as to produce a pulse. FIG. 24 is a time chart showing the time relation among the signals mentioned-above.

The output of a gate circuit 436 which is supplied with the output of the OR circuit 427 is ANDed by an AND circuit 433 with the output of the mono-stable multivibrator 431 and the same output of the waveform shaping circuit 436 is ANDed by another AND circuit 434 with the output of the mono-stable multivibrator 432, so that as will be apparent from FIG. 22, a pulse is produced at the output of the AND circuit 433 when the mode is SP-mode and alternatively a pulse is produced at the output of the AND circuit 433. Accordingly, if the output of the AND circuit 433 is applied to the set input of a flip-flop 435 and the output of the AND circuit 434 is applied to the reset input of the same flip-flop 435, a high level and a low level are produced at the output of the flip-flop 435 when the mode is the SP-one and the LP-one, respectively, so as to enable the mode judgement to be attained. The recording-time mode output is supplied to the tracking error generating circuit 300 so as to be used for the polarity determination of the tracking error signal, or the rotation determination of the pilot signal frequencies in the case of four-frequency pilot system, etc.

Although in the above-described case, a signal indicating the system operating mode is applied to the input of the relative speed judgement circuit 429, a signal representing the rotary speed of a capstan, for example an output of a frequency generator directly connected to a shaft of the capstan, may be used in place of the first-mentioned signal or together with the same. In such an arrangement, since the actual tape reproducing speed can be known, the relative speed and direction can be judged by comparing the actual tape reproducing speed with the tape speed when the tape has been recorded.

Further, it will be apparent from the aforementioned explanation that a switch may be provided so as respectively apply the outputs of the AND circuits 424 and 433 to the set input of the flip-flop 435 and the reset input of the same flip-flop 435, in place of reversing the polarity of the tracking error signal by the polarity controlling circuit 428 in response to the output of the relative speed judging circuit 429.

When the system is changed from the sttopage mode to the reproducing mode, a mistracking state may occur before correct tracing is attained. The mode judgement can be made in this period. Next, in the case where the mode is changed into another one from the SP-mode or LP-mode when a tape is being reproduced, the recording tape-speed of the other mode into which the reproducing operation is to be changed can be used as a reference speed signal for the relative speed judging circuit. In this case, if the reference speed signal is changed immediately after the mode judgement has been achieved, there is a possibility of maloperation when the mode is changed, for example, from the SP-one to the LP-one. To prevent this maloperation, it will do to hold the result of recording mode judgement till correct tracing is attained (till a tape running servo has come in its drawn-back state) after the mode judgement has been achieved. To this end, it will do to hold the output of the OR circuit 427 in its low level after the output of the OR circuit 427 has been applied to the gate circuit 436 and, for example, a pulse has been outputted from the circuit 436 to the AND circuit 433 or 434 till the tape running servo has been drawn back. In this case, the reference speed signal may be changed immediately after the mode judgement has been achieved. Alternatively, the change of the reference speed signal may be delayed till the tape running servo has been drawn back. In this embodiment, there is an advantage that any maloperation does not occur in the reproducing operation at a standard speed since the tracing seldom shifts to the next but one track if the mode judgement is achieved and the tracing is correctly attained. When the four-frequency pilot signal is used, the frequencies of the pilot signal for frequency conversion applied to the frequency converting circuit 302 in the reproducing operation are successively changed over in the same rotation as the recording rotation in the recording operation. However, as shown in FIGS. 1A and 1B, the recording rotation of the pilot signal frequencies is different between the SP and LP modes in the recording operation. Therefore, in the case where the reproducing mode does not correspond to the recording mode recorded on a tape which is now to be reproduced, the rotation of the pilot signal frequencies to be used in the reproducing operation is different from the rotation of the recorded pilot signal frequencies, resulting in discontinuity in the tracking error signal. For example, if the frequency $f_3$ is used in the reproducing operation when the frequency $f_2$ has been used in the rotation in the recording operation, the tracking error signal is reversed in its polarity. This causes large discontinuity of the tracking error signal. Since such discontinuity occurs at the time of changing-over head, it will do that the change of polarity of the tracking error signal at the time of head changing over is not used for the recording mode judgement. To this end, it will do to provide gates between the mono-multivibrator circuits 431, 432 and the AND circuits 433, 434, so as to prevent any pulse generated at the time of head changing over from being applied to the AND circuits 433 and 434.

In the embodiment described above, the recording-time mode can be surely attained with a simple circuit configuration at any tape-reproducing speed so that a magnetic reproducing system may be provided which is inexpensive and which has various kinds of recording-time modes.

Although all the embodiments described above relate to the recording/reproducing system using the four-frequency pilot system, the subject of the present invention is to change the recording rotation of the pilot signal frequencies depending on the recording-time mode, especially to arrange mirror-symmetrically the pilot signal frequencies when two kinds of recording-time modes are used, and therefore the present invention is not limited to the case where the four-frequency pilot system is used. For example, a one-frequency pilot system can be used.

An embodiment of the recording/reproducing system using the one-frequency pilot system will be described hereunder.

FIGS. 25A and 25B show a part of an example of recording patterns of one-frequency pilot signal (for tracking) in a video tape recorder of the rotary two-heads helical scanning type, in which one-frequency pilot signals are arranged in the horizontal retrace regions of the television signal as shown in the drawings. FIGS. 25A and 25B show the respective recording patterns in the first and second recording-time modes, in each of which a one-frequency pilot signal f is recorded every four horizontal scanning periods (4H) on each of the recording tracks A ($A_1$, $A_2$ ... ) and B ($B_1$, $B_2$ ... ). Further, not only the recorded positions of the pilot signal on each one of tracks adjacent to a main track are spatially shifted from the recorded positions of the pilot signal on the main track but also the respective recorded positions of both the right and left tracks adjacent to the main track are arranged such that they are not point symmetrical with respect to the intermediate position of the recorded positions of the pilot signal on the main track.

A recording circuit using the one-frequency pilot system will be described next. FIG. 26 is a block diagram showing an embodiment of the recording circuit using the one-frequency pilot system and FIG. 27 shows waveforms of signals at various portions of FIG. 26 circuit. In FIG. 26, reference numeral 61 denotes an oscillator for producing a single pilot signal. It will do, alternatively, to obtain a single pilot signal by frequency-dividing the output signal of the previously described local oscillating circuit 180 by utilizing the same. Reference numeral 62 denotes a gate circuit for turning on/off the pilot signal with an appropriate timing such that the recording patterns as shown in FIGS. 25A and 25B are formed on a tape. A horizontal synchronizing signal is separated from a television signal by a synchronizing separator circuit 65. The horizontal synchronizing signal is shown in FIG. 27(a). In the embodiments shown in FIGS. 25A and 25B, the pilot signals are recorded every 4H (H being a horizontal period). Accordingly, in response to the output of the synchronizing separator circuit 65, a pulse generating circuit 66 generates four kinds of gate pulses a, b, c, and d which are different in phase from one another and each of which is produced every 4H as shown in (b) to (e) of FIG. 27. The pulse-width of each gate pulse is selected to be substantially equal to one horizontal retrace period.

Based on the head change-over pulse, an extracting-phase determining circuit 71 produces signals e, f, g and h for determining at which phase the pilot signal is extracted for each recording track and applied to gates 67, 68, 69 and 70. In response to the signals e, f, g and h, the phase signals a, b, c and d are selected for each field. The outputs of the gates 67, 68, 69 and 70 are summed up and applied to the gate 62. The on/off controlled pilot signal is added in an adder 63 to a video signal obtained by processing a recording television signal and recorded on a tape through a recording amplifier 64, a head, etc. In the case as above where the respective recorded positions of pilot signals are different from each other between the right and left tracks adjacent to the main track, it is possible to determine from which track a pilot signal has been reproduced, right or left, based on the timing at which the pilot signal is detected in the reproducing operation. For example, when the first head is scanning the track A in FIG. 25A, a pilot signal reproduced 1H after from a pilot signal reproduced from the main track (which pilot signal has the largest level $P_0$ among all the reproduced pilot signals and is referred to as a main pilot signal) is the pilot signal (of which level is assumed $P_1$) which has been reproduced from right adjacent track and a pilot signal reproduced after 2H from the main pilot signal is the pilot signal (of which level is assumed $P_2$) which has been reproduced from the left adjacent track. The level of a pilot signal reproduced after 3H from the main pilot signal is assumed to be $P_3$. FIG. 28 shows the change in time of the reproduced pilot signals. Assume now that in FIG. 25A, i.e. in the SP-mode, the amount of tracking error $E_A$ when A-head is reproducing and the amount of tracking error $E_B$ when B-head is reproducing may be expressed as follows:

$$E_A = P_1 - P_2 + P_3 \quad (1)$$

$$E_B = P_2 - P_3 - P_1 = -E_A \quad (2)$$

FIG. 29a shows the relation between the amount of track shift and the tracking error E.

When the track is correctly traced, the value of the tracking error E is zero, while if the tracing shifts right or left, the value of the tracking error E is positive or negative respectively. By using this fact, the track can be correctly traced by actuating a tracking servo mechanism (for example, by controlling the tape running speed).

The difference in position of the recorded pilot signals between the SP- and LP-mode operations shown in FIGS. 25A and 25B respectively is that the respective arrangements of the pilot signals on the right and left adjacent tracks viewed from the main track are opposite to each other between the former and the latter. That is, the respective arrangements of FIGS. 25A and 25B are mirror symmetrical.

As a result, in the LP-mode, the tracking error E is opposite in its polarity to that in the SP-mode as seen in FIG. 29b. Namely, in FIGS. 29a and 29b, with respect to the point A at which the amount of track shift is zero (the reproducing level of video signal is maximum), the tracking error E changes from negative to positive when the track shift increases in the SP-mode, while it changes from negative to positive in the LP-mode. By using this, the mode can be judged whether it is SP-one or LP-one. It will do, of course, to use a signal which is obtained by reversing the tracking error signal in its polarity as the signal to be applied to servo circuit, in order to cause a tracking servo to correctly operate in the LP-mode. It is noted that in FIG. 29 the axis of abscissa is not time but it is the amount of track shift. That is, it is necessary to know the change in time of the track shift amount.

To which direction in the axis of abscissa the track shift changes, in the positive direction or negative direction, is determined in accordance with the difference between the respective tape speeds in the recording and reproducing operations, and therefore the direction of the change in time of the tracking error amount at the point A relates not only to the recording-time mode but to the difference between the respective tape speeds in the recording and reproducing operations. This difference between the respective tape speeds in the recording and reproducing operations can be easily determined by the operating mode of the reproducing systems at that time and the number of rotation of the capstan.

That is, in the process during which the reproducing system is caused to be in the reproducing mode from the sttopage one and the tape speed rises from zero, the reproducing tape speed is lower than the recording tape speed and the track shift changes in the decreasing direction in FIG. 29. Also when the recording-time mode of a signal recorded on a tape changes from the LP-one to the SP-one during the reproducing operation of the tape in the standard speed, the amount of track shift changes in the decreasing direction in FIG. 29. On the contrary, when the recording mode changes from the SP-one to the LP-one, the amount of track shift changes in the increasing direction.

Further, in the variable speed reproducing operation, the amount of track shift changes in the increasing and decreasing directions in the forward and backward rotary searches respectively. In the slow reproducing operation and other various kinds of variable speed reproducing operation, whether the amount of track shift changes in the decreasing direction or in the increasing direction can be determined in accordance with the change of the recording-time mode of the signal recorded on a tape.

It is possible to cause the direction of change of the amount of track shift to coincide equivalently with the direction of the time axis by controlling the polarity of the tracking error signal used for the judgement of recording-time mode, in accordance with the determination whether the amount of track shift changes in the increasing or decreasing direction. That is, when the track shift amount decreases, it is possible to cause the direction of change of the track shift amount to coincide with the time axis in FIG. 29.

In this manner, the trackig error amount changes in time at the point A from negative to positive in the SP-mode and from positive to negative in the LP-mode. By using this difference in the direction of change, it is made possible to judge the recording-time mode.

FIG. 30 shows an example of the recording-time mode judging circuit. A pilot signal is extracted from a head reproducing signal through a band-pass filter 310 with a recording pilot signal frequency as its central frequency and detected by an envelope detecting circuit 311. A tracking error signal generating circuit 312 detects a maximum level of a reproducing pilot signal so that the values $P_1$, $P_2$ and $P_3$ are obtained based on the detected maximum level of the reproducing pilot signal to achieve the operation of the above-mentioned equation (1) so as to produce a tracking error signal E. A polarity reversing circuit 313 reverses the polarity of the tracking error signal E depending on the fact whether the head which is now achieving reproducing operation is the head A or head B, as shown in the above-mentioned equations (1) and (2). The output of the polarity reversing circuit 313 is the tracking error signal E which is applied to a servo circuit. A polarity controlling circuit 440 according to the present invention determines whether the polarity is to be reversed or not based on the output of a relative speed judging circuit 441. The relative speed judging circuit 441 judges the direction of the difference frequency between the respective tape speeds of a signal recorded on a tape in the recording and reproducing operations and produces a control signal which is applied to the polarity controlling circuit 440 so as to cause the circuit to produce a non-reversed error signal when the above-mentioned difference frequency direction is judged to be a forward one, while produce a reversed error signal, on the contrary, when the direction is judged to be a backward one. The relative speed judging circuit 441 is supplied with a mode signal which indicates the status of operating mode of the system (whether the system is in the forward rotating state or backward rotating state, whether the system is in the reproducing state in the SP-mode or LP-mode, or the like) and another signal representing the rotary speed of the capstan (the output of a frequency generator directly connected to the capstan shaft, or the like), so that the direction of the relative speed is judged. Thus, it is possible to make the axis of abscissa coincide with the time axis in FIG. 29.

An envelope detecting circuit 442 detects the level of a reproducing FM signal when a video signal is frequency modulated. A waveform shaping circuit 443 produces a high level when the reproducing FM level exceeds a threshold level. FIG. 31 shows waveforms of signals at various parts in the circuit in FIG. 30. That is, a high level is produced from the waveform shaping circuit 443 when the first or second head traces at the vicinity of a correct track. The output of the polarity controlling circuit 440 is shaped in a waveform shaping circuit 444 in a manner as shown in FIG. 31. The waveforms of the respective outputs of a mono-stable multivibrator 445 which is actuated by the rising of the output of the waveform shaping circuit 444 and another mono-stable multivibrator 446 which is actuated by the falling of the output of the same waveform shaping circuit 444 are shown in FIG. 31. The respective output of the waveform shaping circuit 443 and the mono-stable multivibrator 445 are applied to an AND circuit 447 and the respective output of the waveform shaping circuit 443 and the mono-stable multivibrator 446 are applied to an AND circuit 448 so that a pulse appears at the output of the AND circuit 447 when the recording mode is the SP-one and at the output of the AND circuit 447 when the recording mode is the LP-one, as seen in FIG. 31. Accordingly, if the respective output pulses from the AND circuits 447 and 448 are applied to the set and reset terminals of a flip-flop 449, the level of output of the flip-flop 449 is made high in the SP-mode while low in the LP-mode so as to make possible the judgement of the recording-time mode. In FIG. 30, a switch may be provided so as to apply the outputs of the AND circuits 447 and 448 to the reset and set terminals of flip-flop circuit 449 in place of reversing the tracking error signal by the output of the relative speed judging circuit 441. It will be apparent that the switch can equivalently correctly attain the function. Since a large track shift may be generated in the case where the recorded tape speed with which the signal has been recorded on the tape in the recording operation changes during the reproducing operation, or where the system is changed into its reproducing state from its sttopage state, it is made possible to judge the recording-time mode by the above-mentioned means. Since there is a possibility of mal-operation due to a little speed variation during the tracing is correctly attained in the embodiment of FIG. 30, it will do to achieve the mode judgement only when the amount of tracking error exceeds a predetermined value. This may be attained, for example, by providing a gate circuit 450 at the output of the waveform shaping circuit 443 which opens the gate for a predetermined period so as to achieve the mode judgement only when the tracking error amount exceeds a predetermined value. Alternatively, it is possible to use the point B corresponding to the center of the adjacent track in place of the point A in FIG. 31. In this case, it will be apparent from the above-description that the correct operation can be attained by using the reversed waveform of that shown in FIG. 31 as the output of the waveform shaping circuit 443 and connecting the outputs of the AND circuits 447 and 448 to the reset and set terminals respectively. In the case where there is a possibility of a maloperation in a period from the time the mode judgement has once been effected to the time the servo is actuated so as to attain the tracing correctly, it is also possible to prevent the maloperation from occuring by causing the gate circuit 450 to close its gate to prevent the mode judgement from being achieved till the servo has been drawn back.

Each of FIGS. 32A and 32B shows a part of a further example, according to the present invention, of a recording pattern of one-frequency pilot signal, in which one-frequency pilot signals in phase by 180 degrees are arranged in the horizontal retrace regions as shown in the drawings. FIGS. 25A and 25B show the respective recording patterns in the first and second recording-time modes, and the respective arrangement of record of the pilot signals in FIGS. 32A and 32B are mirror symmetrical with each other, similarly to the previous case.

The example of FIGS. 32A and 32B is the same as that of FIGS. 25A and 25B in that a pilot signal is recorded in the horizontal retrace region but different in that the pilot signals arranged in phase by 180 degrees are used in the former. In each of FIGS. 32A and 32B, the pilot signals are recorded at positions indicated by the marks "0" and "$\pi$" and being in phase by 180 degrees from each other. Since the pilot signals are recorded every 2H in this example, it is made possible to distinguish the pilot signals reproduced from the main track from the pilot signals reproduced from the adjacent tracks by inputting the reproduced pilot signal onto the 2H delayed line so as to effect addition and subtraction therebetween.

Further, it is possible to determine from which one of the adjacent tracks, right one or left one, a pilot signal has been reproduced, by the fact that the reproducing timings are different from each other between the reproducing from the right adjacent track and left adjacent one.

FIG. 33 shows the track shift amount and the tracking error E (the level difference between the respective reproduced pilot signals from the right and left adjacent tracks) in FIGS. 32A and 32B. The variations in tracking error shown in FIG. 33 are essentially the same as those shown in FIG. 29. Accordingly, the judgement of the recording-time mode can be achieved also in this case by the same means as that described with respect to FIGS. 30 and 31.

We claim:

1. A magnetic recording system comprising:
video signal processing means including a separating circuit for separating at least one of a luminance signal and a chrominance signal from a video signal, a frequency-modulating circuit for receiving said luminance signal and for frequency-modulating said received luminance signal, frequency converting means for receiving said chrominance signal and for converting a frequency of said received chrominance signal into a low-frequency band, and mixing circuit means for mixing said frequency-modulated luminance signal and said low-frequencyconverted chrominance signal so as to provide a video signal for recording;
recording means for recording said video signal from said video signal processing means onto a magnetic tape, said recording means including at least a first and second rotary magnetic head for forming recording tracks for at least a first and a second channel in an oblique direction on said magnetic tape and for recording field video signals of said first and second channels onto said first and second channel recording tracks:
pilot signal generating means for generating a pilot signal;
means for adding said pilot signal from said pilot signal generating means to said video signal from said video signal processing means to be multiplexed with said video signal;
said video signal processing means further including reference signal generating means for generating a reference signal having a frequency which is an integer multiple of a chrominance subcarrier of said low-frequencyconverted chrominance signal; and
said pilot signal generating means being coupled with said reference signal generating means and including frequency dividing means for frequency-dividing said reference signal from said reference signal generating means to produce a low-frequency pilot signal.

2. A magnetic recording system according to claim 1, wherein said reference signal generating means is connected with said frequency converting means for supplying said reference signal to said frequency converting means.

3. A magnetic recording system according to claim 2, wherein said reference signal has a frequency which is eight times the frequency of said chrominance subcarrier of said low-frequency converted chrominance signal.

4. A magnetic recording system according to claim 2, wherein said reference signal generating means further includes a reference signal generating circuit for generating a signal having a frequency based on a horizontal synchronizing frequency of said video signal as said reference signal, a frequency dividing circuit for receiving an output of said reference signal generating circuit and for frequency-dividing said output signal into a predetermined low-frequency signal, and phase-shifting circuit for receiving said predetermined low-frequency signal from said frequency dividing circuit and for phase-shifting said predetermined low-frequency signal by 90 degrees or 180 degrees every horizontal period;

said frequency converting means of said video signal processing means further includes a frequency converting circuit for receiving said chrominance signal from said separating circuit and an output of said phase-shifting circuit and for causing the frequency of said chrominance signal to be equal to the frequency of said predetermined low-frequency signal produced by said frequency-dividing circuit; and said frequency dividing means of said pilot signal generating means includes a frequency dividing circuit for receiving said reference signal and for frequency-dividing said received reference signal, and deriving means for deriving said pilot signal from said frequency dividing circuit and for supplying said pilot signal to said video signal processing means.

5. A magnetic recording system according to claim 4, wherein said reference signal generating circuit includes a phase locked loop circuit for producing a frequency which is N (N being integer) multiple of said horizontal synchronizing frequency of said video signal $f_H$, said frequency dividing circuit of said pilot signal generating means receiving an output signal of said phase locked loop circuit and for producing a four-frequency pilot signal having four low-frequencies ($f_1$, $f_2$, $f_3$, $f_4$), said pilot signal deriving means includes frequency selecting means for receiving said four frequency pilot signal and for cyclically selecting said four low-frequencies.

6. A magnetic recording system according to claim 5, characterized in that said frequency dividing circuit of said pilot signal generating means includes at least four frequency dividers for frequency-dividing said output frequency of said phase locked loop circuit so as to produce said four-frequency pilot signal having four frequencies ($f_1$, $f_2$, $f_3$, $f_4$) each having an offset of a value within a range from $0.2f_H$ to $0.7f_H$ with a relation $f_1 - f_2 = f_3 - f_4$ thereamong.

7. A magnetic recording system according to claim 4, wherein said reference signal generating circuit includes a phase locked loop circuit for producing a frequency which is 3N (N being integer) multiple of said horizontal synchronizing frequency of said video signal $f_H$, said frequency dividing circuit of said reference signal generating means including a one-eighth frequency dividing circuit for receiving an output signal of said phase locked loop circuit and for frequency-dividing said received output signal of said phase locked loop circuit into substantially one-eighth, said frequency dividing circuit of said pilot signal generating means receiving an output of said phase locked loop circuit for producing a four-frequency pilot signal having four low-frequencies ($f_1$, $f_2$, $f_3$, $f_4$) said pilot signal deriving means includes frequency selecting means for receiving said four-frequncy pilot signal and for cyclically selecting said four low-frequencies.

8. A magnetic recording system according to claim 2, wherein said reference signal generating means of said video signal processing means includes a phase locked loop circuit for producing a frequency which is 3N (N being integer) multiple of a horizontal synchronizing freuqency of said video signal, a one-eighth frequency-dividing circuit for frequency-dividing an output frequency of said phase locked loop circuit into a one-eighth frequency-divided signal, a phase-shifting circuit for receiving said one-eighth frequency-divided signal for phase-shifting said received one-eighth frequency-divided signal by 90 degrees or 180 degrees only one side field every horizontal period, an oscillating circuit for oscillating with the same frequency as that of a chrominance subcarrier of said chrominance signal of said video signal, and a first frequency converter for mixing the respective outputs of said phase-shifting circuit and said oscillating circuit to provide a local oscillating signal, said frequency converting means of said video signal processing means includes a second frequency converter for mixing said local oscillating signal and said chrominance signal to cause the frequency of said chrominance signal to be equal to the frequency of said one-eighth frequency-divided signal so as to obtain said low-frequency converted chrominance signal, and means for leading said low-frequency converted chrominance signal to said first and second rotary magnetic heads, and said frequency dividing means of said pilot signal generating means frequency-dividing an output frequency of said phase locked loop circuit to produce a four-frequency pilot signal having four signals ($f_1$, $f_2$, $f_3$, $f_4$), and a frequency selecting circuit for cyclically selecting said four-frequency pilot signal.

9. A magnetic recording system according to claim 2, wherein said reference signal generating means of said video signal processing means includes first carrier generating means for generating a first carrier having a frequency which is N (N being an integer) multiple of a horizontal synchronizing frequency of said video signal, first frequency dividing means for frequency-dividing said first carrier frequency into substantially one-eighth, first frequency converting means for receiving an output signal of said first frequency dividing means and a second carrier having a frequency which is substantially the same as that of a carrier chrominance signal in said input video signal to thereby produce a frequency which is a sum of the frequencies of the received signals, and said frequency converting means of said video signal processing means receiving a carrier chrominance signal extracted from said video signal and an output signal of said first frequency converting means to thereby produce a difference frequency between the receiving signals, and said frequency driving means of said pilot signal generating means including first dividing means for frequency-dividing said first carrier frequency into substantially one-half, second dividing means for frequency-dividing an output of said first dividing means into at least four frequencies, and frequency selecting circuit means for selecting outputs of said second dividing means.

10. A magnetic recording system according to claim 1, further comprising recording-time mode changing-over means for controlling a feeding speed of said magnetic tape so as to change over a recording time mode for recording operation onto said magnetic tape between at least a first and a second recording time modes, said pilot signal generating means including means for generating a first pilot signal corresponding to said first recording time mode and a second pilot signal corresponding to said second recording time mode and for alternatively producing one of said first and second pilot signals in accordance with the selection of one of said first and second recording time modes.

11. A magnetic recording system according to claim 10, wherein said pilot signal generating means generates said first and second pilot signals such that when said first and second pilot signals are recorded in said recording means the respective recording arrangements thereof are mirror symmetric.

* * * * *